United States Patent
Galigani et al.

(10) Patent No.: US 7,172,396 B2
(45) Date of Patent: Feb. 6, 2007

(54) CURING MACHINE FOR PRODUCING TIRES FOR ROAD VEHICLES AND THE LIKE

(75) Inventors: Tiziano Galigani, Pistoia (IT); Daniele Brogi, Florence (IT); Massimo Capecchi, Pistoia (IT)

(73) Assignee: Cima Impianti S.p.A. (IT)

( * ) Notice: Subject to any disclaimer, the term of this patent is extended or adjusted under 35 U.S.C. 154(b) by 150 days.

(21) Appl. No.: 10/487,664

(22) PCT Filed: Aug. 19, 2002

(86) PCT No.: PCT/IT02/00542

§ 371 (c)(1),
(2), (4) Date: Sep. 1, 2004

(87) PCT Pub. No.: WO03/018301

PCT Pub. Date: Mar. 6, 2003

(65) Prior Publication Data

US 2005/0019440 A1    Jan. 27, 2005

(30) Foreign Application Priority Data

Aug. 24, 2001 (IT) .............................. FI2001A0160

(51) Int. Cl.
*B29D 30/06* (2006.01)

(52) U.S. Cl. .............................. 425/36; 425/38; 425/48

(58) Field of Classification Search .................. 425/36, 425/38, 48, 58
See application file for complete search history.

(56) References Cited

U.S. PATENT DOCUMENTS

| | | | |
|---|---|---|---|
| 3,153,263 A * | 10/1964 | Mallory et al. ................ 425/32 |
| 4,236,883 A | 12/1980 | Turk et al. | |
| 4,452,577 A | 6/1984 | Irie | |
| 4,545,750 A * | 10/1985 | Sarumaru ..................... 425/36 |
| 4,547,012 A | 10/1985 | Krebs | |
| 4,582,470 A * | 4/1986 | Sarumaru ..................... 425/36 |
| 4,600,370 A * | 7/1986 | Kaneko et al. ................ 425/38 |
| 4,606,714 A | 8/1986 | Nixon et al. | |
| 4,871,305 A * | 10/1989 | Galigani ....................... 425/36 |
| 4,950,142 A | 8/1990 | Katayama et al. | |
| 5,127,811 A | 7/1992 | Trethowan | |
| 5,246,360 A * | 9/1993 | Murakami et al. ............. 425/48 |
| 5,290,503 A * | 3/1994 | Katayama et al. ............ 425/36 |
| 5,776,508 A | 7/1998 | Irie | |

FOREIGN PATENT DOCUMENTS

| | | |
|---|---|---|
| GB | 1177617 | 1/1970 |
| JP | 57148638 | 9/1982 |

* cited by examiner

*Primary Examiner*—James P. Mackey
(74) *Attorney, Agent, or Firm*—McGlew & Tuttle, PC

(57) ABSTRACT

Two opposed coaxial discoidal elements (35, 37) are diametrically dilatable and are able to move independently of each other axially and pass axially into the tire (P) when the tire is positioned in the mold, in such a way as to dilate each of said discoidal elements (35, 37), for engaging a corresponding annular bead (P1, P2) of the tire and positioning it exactly against the edge of the respective pan (13, 15).

20 Claims, 51 Drawing Sheets

Fig.7

CURING MACHINE FOR PRODUCING TIRES FOR ROAD VEHICLES AND THE LIKE

The subject of the invention is an improved machine for curing the green rubber of tires, its main object being the positioning of the green tire, which generally tends to deform—and so cause defects—when placed in the open mold of the curing press.

These and other objects and advantages will become obvious in the course of the text which follows.

The machine comprises a mold with two circular pans or end plates and peripheral sectors defining the tread, and with bladder means for creating a pressure inside the tire.

According to the invention, the machine comprises:

two opposed diametrically dilatable coaxial discoidal elements that are able to move axially independently of each other and to pass axially into the tire when the tire is positioned in the mold;

control means for dilating each of said discoidal elements, for engaging a corresponding annular bead of the tire and positioning it exactly against the edge of the respective pan;

means for supplying a shaping gas at limited pressure into the tire while the two pans are being moved toward each other during mold closure; and means for discharging at the appropriate time the fluids from inside the tire and from the sucker means.

These discoidal elements in practice have sectors that can be moved radially by said control means and contact surfaces for engaging the annular beads of the tire.

The sectors are radially movable and can be operated by shaped links pivoting on an angularly movable actuator disk coaxial with said discoidal elements.

The discoidal elements may have spring-loaded pegs for making contact with the inner edge of the annular beads of the tires and able to retract on contact with the circular pans or end plates of the mold when said discoidal elements approach the respective circular pans or end plates of the mold.

For bringing about the axial movements of said discoidal elements there may be provided: a first actuator for lowering both of said discoidal elements into the tire, and raising them again; and a second actuator for axially moving one of said discoidal elements with respect to the other.

Advantageously, the control means for dilating each of said discoidal elements are able to bring about a partial dilation before the axial movement to contact the respective annular bead of the tire, followed by a further dilation to make radial contact with the edge of said bead, by means of said spring-loaded pegs.

The bladder means are in practice tubular in shape, with the two annular edges engaged on movable members of two axial actuators capable of positioning the bladder means in the mold in the closed position; means are provided for supplying a fluid—especially a liquid—at pressure into the bladder means for the molding and curing stage.

Said axial actuators may be cylinder-and-piston systems; one of said axial actuators may be in the form of a cylinder-and-piston system which lifts the bladder assembly and the other of said axial actuators may comprise two symmetrical toggles controlled by a gear pair mechanism controlled by a single fluid actuator.

A clearer understanding of the invention will be gained from the description and the accompanying drawing, the latter showing a practical, non-restrictive example of an embodiment thereof. In the drawing:

FIGS. 1–6 are general views of the machine in six initial stages of loading the tire leading up to the heat-treatment position;

FIGS. 7, 8 and 9 show schematic plan views of the stages of FIGS. 1 and 2; 3 and 4; and 5 and 6;

FIGS. 10–21 show the upper assembly of the machine in vertical cross sections (FIG. 10 being on a larger scale than the others), during the stages of loading the green tire, and up to the stage of partial closure of the mold, and for curing;

FIGS. 22 and 23, 24 and 25, and 26 and 27 are plan views on planes XXII—XXII and XXVII—XXVII as marked in FIG. 11, to illustrate the positions of the parts in the stages shown in FIGS. 10 and 11; 12–14; and 15–18;

Figure 1:
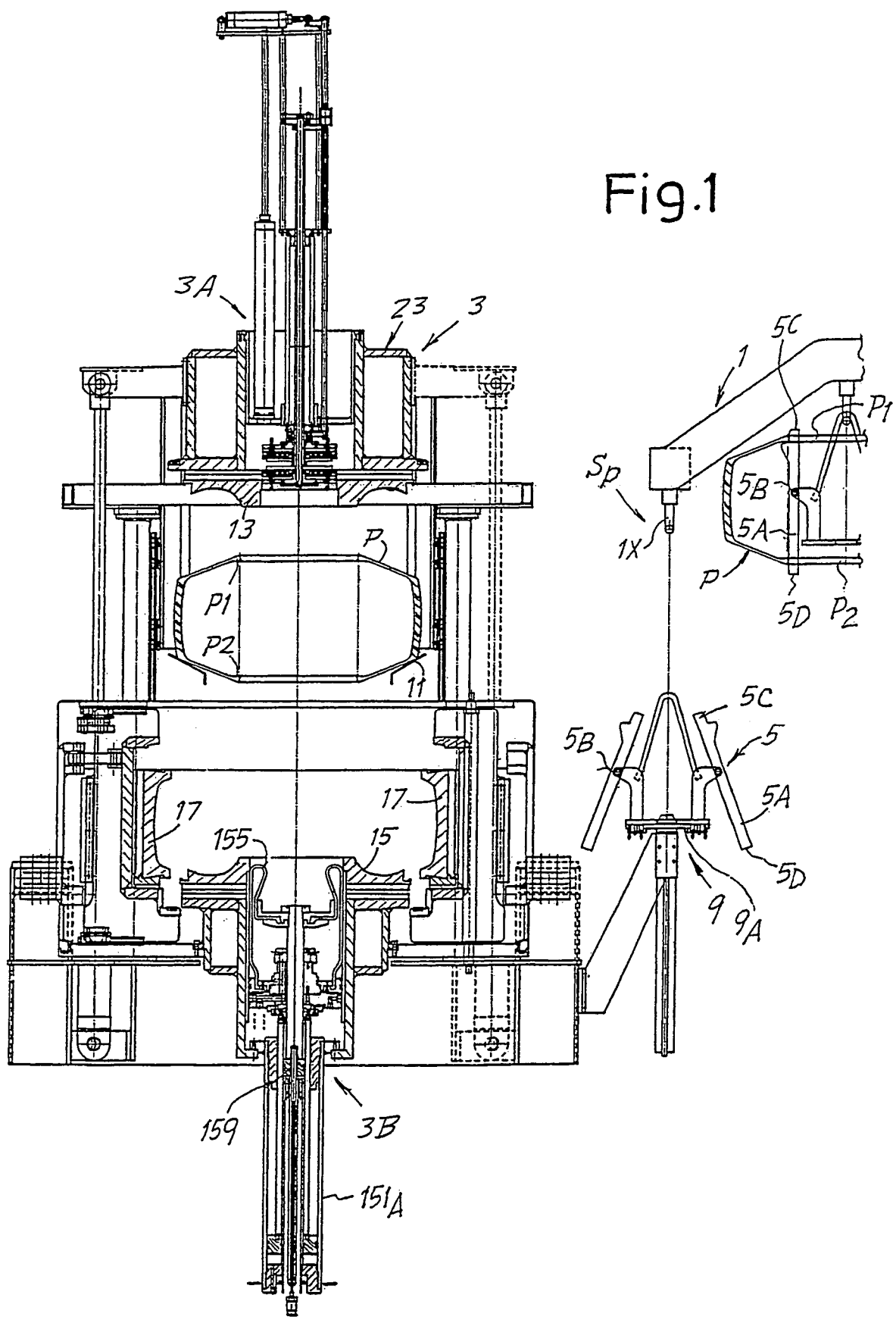
Figure 2:
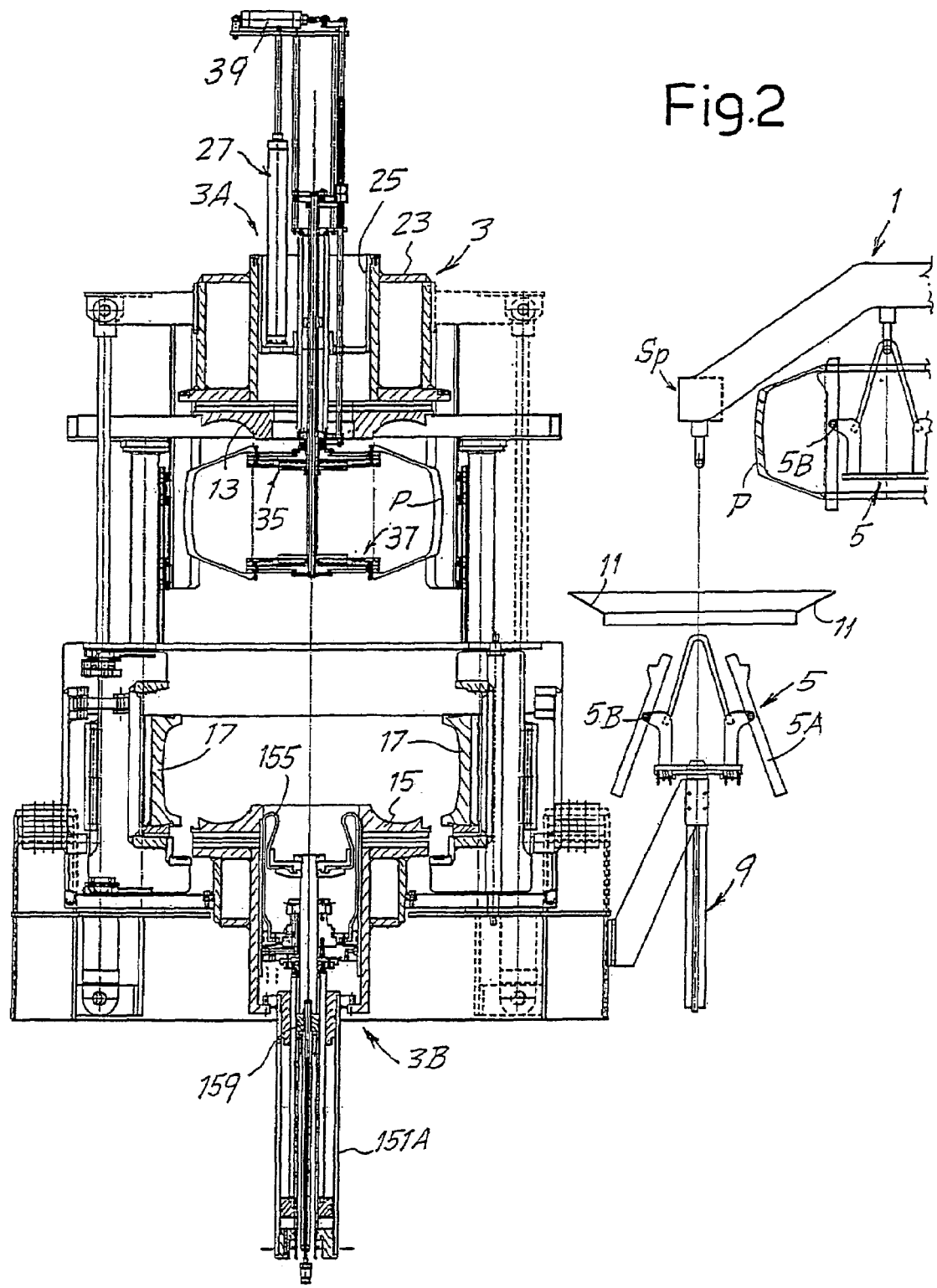
Figure 3:
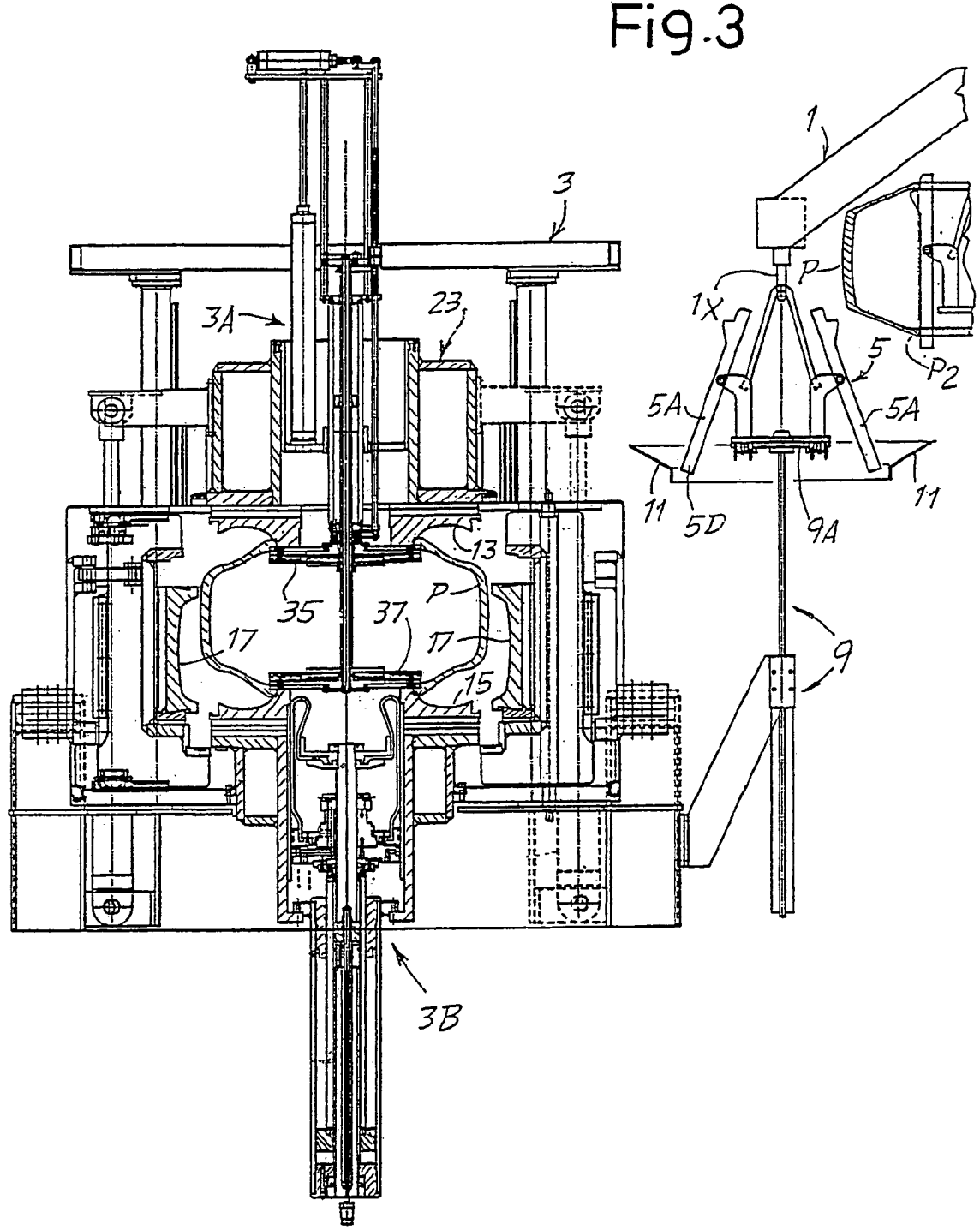
Figure 4:
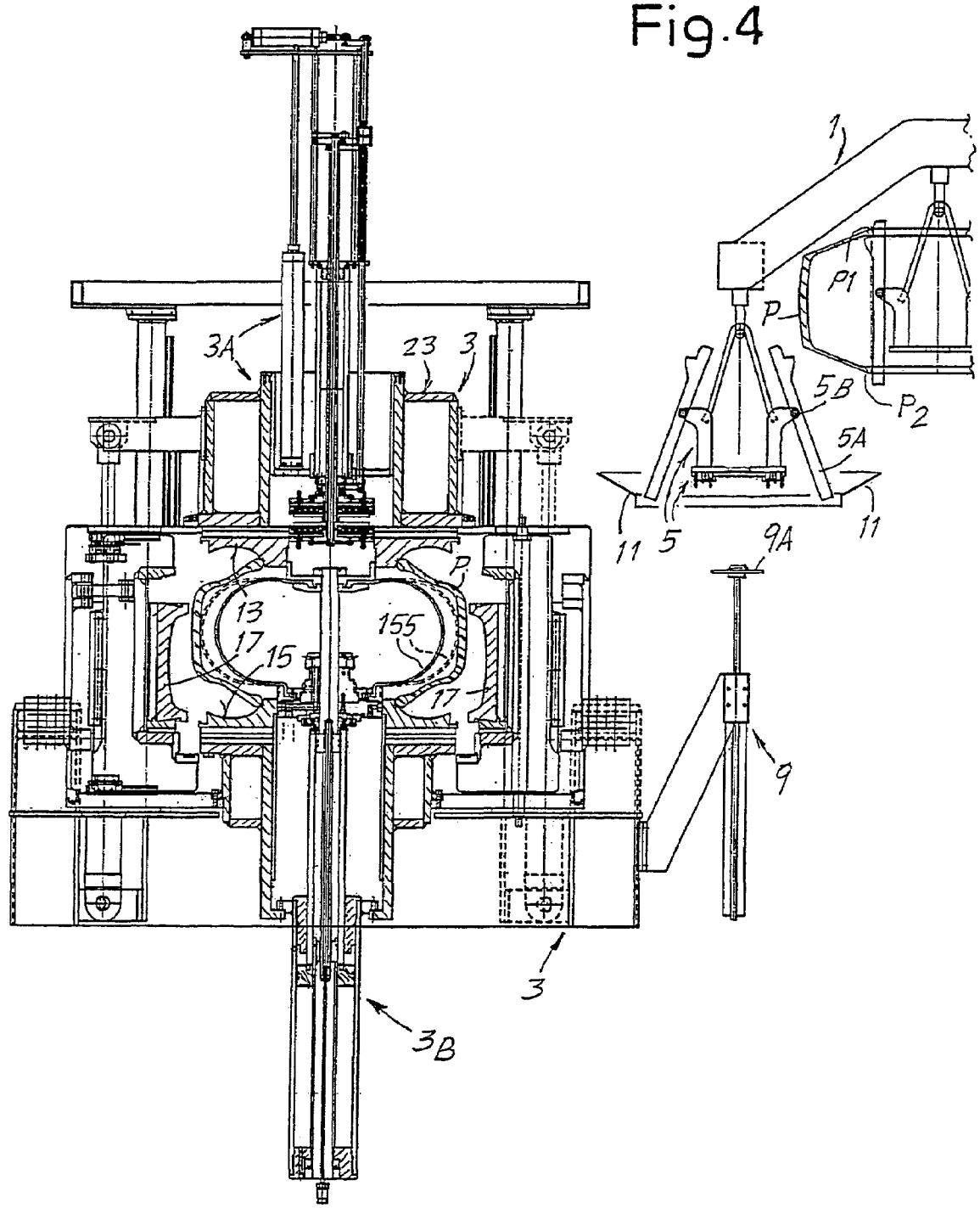

In the drawing, referring initially to all FIGS. 1–9, the reference number 1 denotes a horizontal conveyor for feeding green tires P to the machine, the latter having the general reference 3; reference number 5 is a general label for individual supports carried by the conveyor 1. Each support 5 comprises a plurality of arms 5A which pivot spontaneously or under control, the job of which is to engage the top edge P1 of the green tire P that is to be conveyed to the machine 3 with movements indicated by the arrows f1 (FIGS. 7–9) which show the direction of movement of the conveyor 1. These arms 5A are also designed to act on the lower edge P2 of the tire, the two edges P1 and P2 forming the annular beads typical of tires for road vehicles. The machine 3 comprises a collecting mechanism 9 which has a plate 9A which, as it rises, picks up whichever support 5 has reached the position above the collecting mechanism 9 with the tire P and, as it descends, lowers said tire P onto an annular pan 11 which is positioned at the right moment underneath the tire and will then transfer said tire into the machine 3 in line with and underneath the upper assembly 3A (described later) of the machine 3. The handling means of the annular pan 11 are not described as their construction is obvious. The collecting mechanism 9 is able to raise the support 5 without its tire P and hang it back on the conveyor 1, which thus takes said support 5 away for subsequent loading of another tire. Feed operations are thus performed cyclically as each heat-treatment cycle is completed.

The machine 3 comprises, in addition to said upper assembly 3A exhaustively illustrated in FIGS. 1–34, a lower assembly which is made in two different embodiments. One version of said lower assembly 3B is sketched in FIGS. 1–4 and shown more particularly in FIGS. 35–44, while FIGS. 45–54 show a different version of said lower assembly. The upper assembly 3A is illustrated in FIGS. 1–34.

The machine 3 comprises a mold consisting of two circular pans or end plates, one upper 13 and one lower 15, and of peripheral sectors 17 capable of being moved inward and outward to close and reopen the mold, while the two pans or end plates 13 and 15 can be moved inward and outward in vertical axial directions. The configuration of the mold operating mechanisms are of a type known per se, except for the function that is to be given to each mechanism for the sequences of the operating cycle of the machine, which will be described below.

The upper assembly 3A of the machine 3 comprises a structure 23 beneath which the upper pan or end plate 13 of the mold is fitted. Housed inside a cylindrical wall 23A of the structure 23 is a large cup 25, from the bottom of which there extends the cylinder 27A of a vertical actuator 27, the rod 27B of which piston supports at its upper end a plate 29 capable of being moved vertically by the actuator 27. The plate 29 has rods 31 supporting the cylinder 33A of an actuator 33, whose piston 33B is integral with a tubular piston rod 33C. The actuator 33, 33A, 33B, 33C can be moved vertically by the movements of the plate 29 brought about by the actuator 27, 27A, 27B. The cylinder 33A of the actuator 33 can slide through the bottom of the cup 25 and supports at its lower end, beneath said cup, a first discoidal element 35 which is capable of diametrical dilations and will be described later. A second discoidal element 37, essentially symmetrical and similar to the previous such element, is supported however by the tubular rod 33C of the piston 33B of said actuator 33: the second discoidal element 37 can therefore be moved with respect to the first discoidal element 35 by the actuator 33, which can move its piston 33B and therefore its rod 33C and hence the discoidal element 37 with respect to the cylinder 33A on which the first or upper discoidal element 35 is mounted. The actuator 27 is therefore able to move both discoidal elements 35, 37 simultaneously to various positions with respect to the circular pan or end plate 13 of the mold, as can be seen by comparing the sequence of FIGS. 23–27 and 27–31. The actuator 33 in turn is capable of moving the discoidal element 37 with respect to the discoidal element 35, thereby moving the two discoidal elements 35, 37 toward and away from each other as can be seen again by a comparison of FIGS. 22–27 and 28–31, and as will be described in further detail when explaining the operation of this assembly.

The two discoidal elements 35, 37 are essentially equivalent and only element 35 will be described with particular reference to FIGS. 22 and 24.

The plate 29 (which can be moved vertically by the action of the actuator 27) has its own cylinder-and-piston actuator 39 which pivots at 41 on the plate 29 and possesses, at the end of its piston rod (see in particular FIGS. 23, 25 and 27), a pivot 43 for a crank 45. This is integral with a vertical shaft 47 which can thus be controlled by the actuator 39 to make limited angular movements. At its bottom end, the shaft 47 comes to a drive 49 (see also FIG. 34) which imposes angular movements on a plate 51 on which there pivot at 53 a plurality of shaped links 55 (see also FIGS. 32–34). Formed on the discoidal element 35 are a plurality of radial guides 57, along each of which runs a slide 59, and on the outer end of the slide is a flat sector 61 to which is connected at 63 the opposite end of a corresponding shaped link 55 from where it pivots 53 on the plate 51. Rotation of the plate 51 changes the angle of the links 55, which causes a radial excursion of the corresponding slides 59 and their sectors 61, in centripetal and centrifugal radial directions. Each sector 61 has a pair of spring-loaded pegs 65: these are parallel to the axis of axial movement of the discoidal elements 35, 37 and are stressed elastically to project and can withdraw inside their respective sector 61.

The shaft 47 has a splined section 47A in angular but not axial engagement with a crank 71 corresponding essentially to the crank 45 and performing the same angular movements as the latter and as the shaft 47 and drive 49. The crank 71 forms part of a parallel-motion mechanism 73 which transmits the angular movements of the shaft 47 to a shaft 75 inside the tubular shaft 33C forming the rod of the piston 33B of the actuator 33, with respect to which the shaft 75 is completely independent while it can slide vertically with respect to the tubular rod 33C of the actuator 33. In effect the shaft 75 describes angular movements identical to those of the shaft 47 of the drive 49 and said shaft 75 transmits these angular movements to a plate 77 connected to the discoidal element 37 in a similar way to the plate 51 connected to the discoidal element 35. The plate 77 has pivoting on it at 79 a number of shaped links 81 similar to the links 53 which in turn pivot on sectors 83 similar to the sectors 61 with spring-loaded pegs 85 extending in the opposite direction to the spring-loaded pegs 65 on the sectors 61.

Basically, the two dilatable discoidal elements 35, 37 are practically and functionally symmetrical with respect to a plane perpendicular to the axis of the central shafts 33C, 75 of the upper assembly 3A. The two discoidal elements 35 and 37 are operated symmetrically as regards the movements of the sectors 61 and 83 of the mechanisms described, from the actuator 39 which controls the shaft 47. This actuator 39 can induce angular movements in the shaft 47 in at least two stages and at least two successive strokes, in at least the direction that brings about the centrifugal movements of the sectors 61 and 83 for the purposes described below and which relate basically to the centering of the annular beads P1 and P2 of the tires P.

Figure 22:
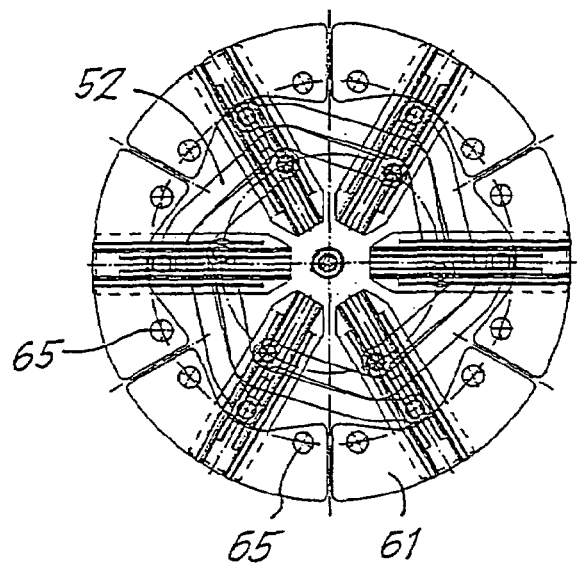
Figure 23:
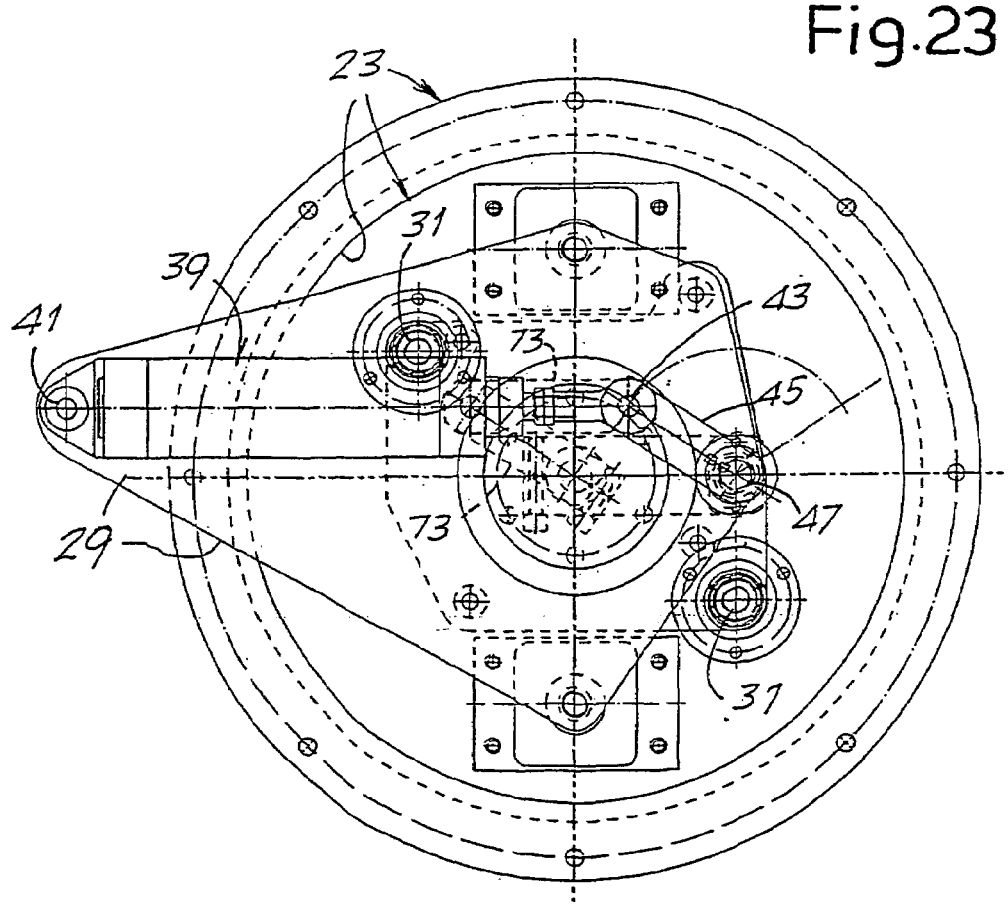
Figure 24:
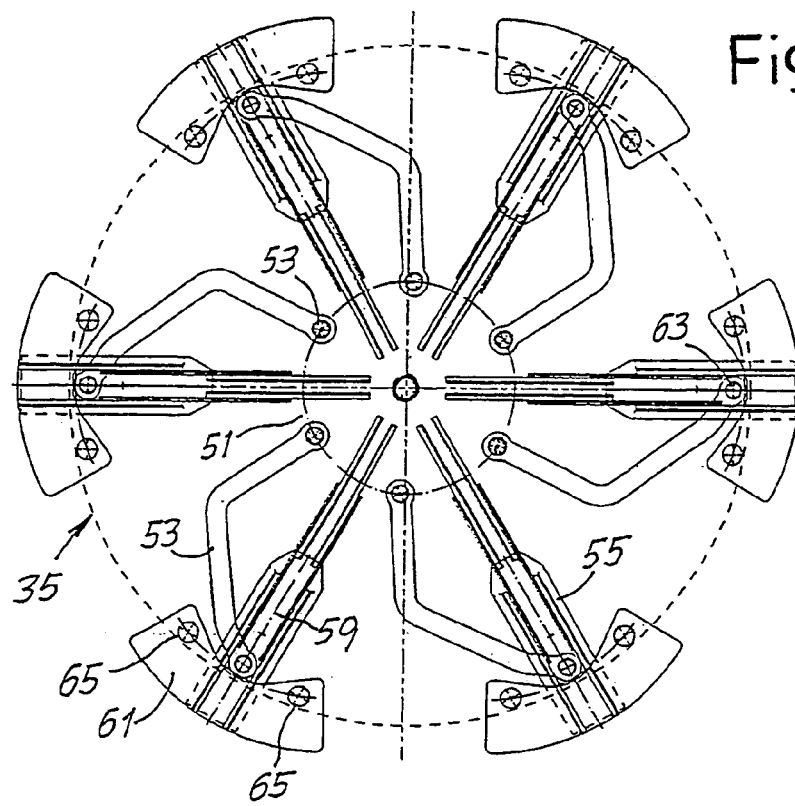
Figure 25:
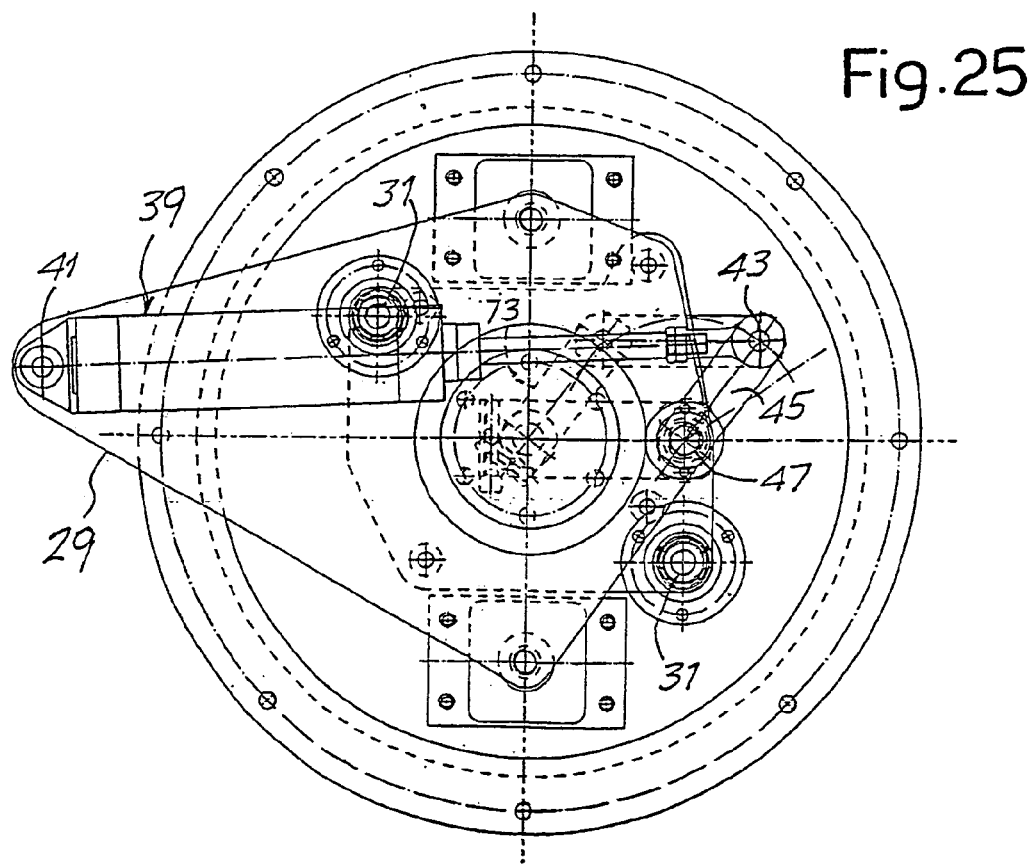
Figure 26:
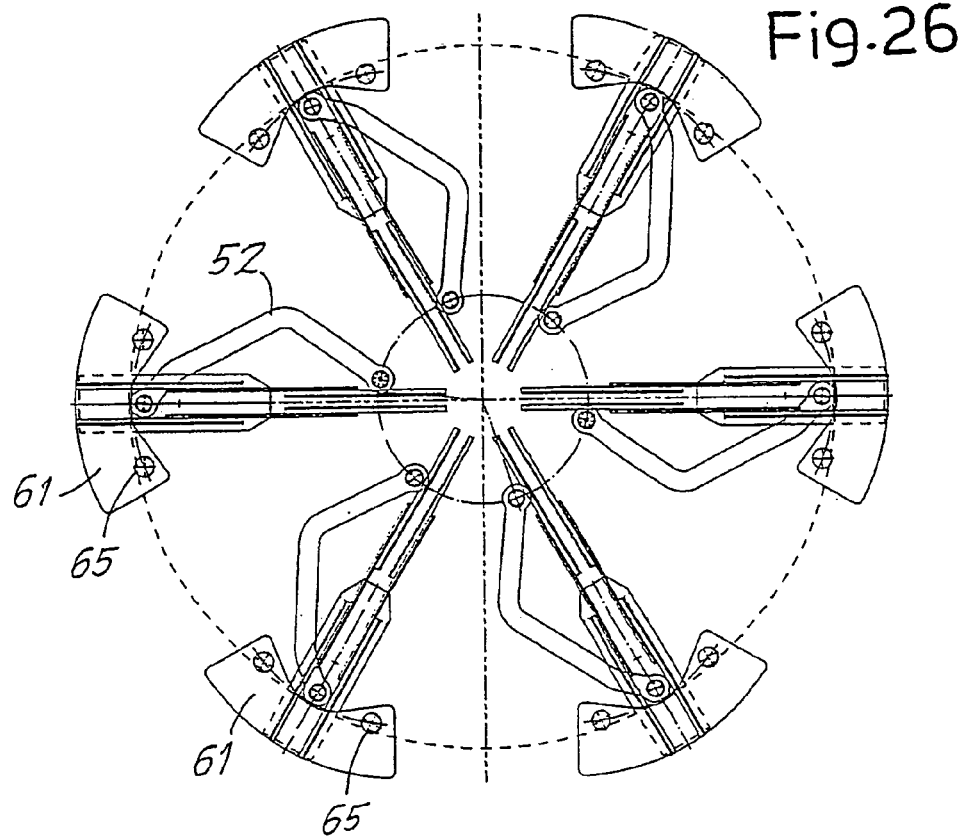
Figure 27:
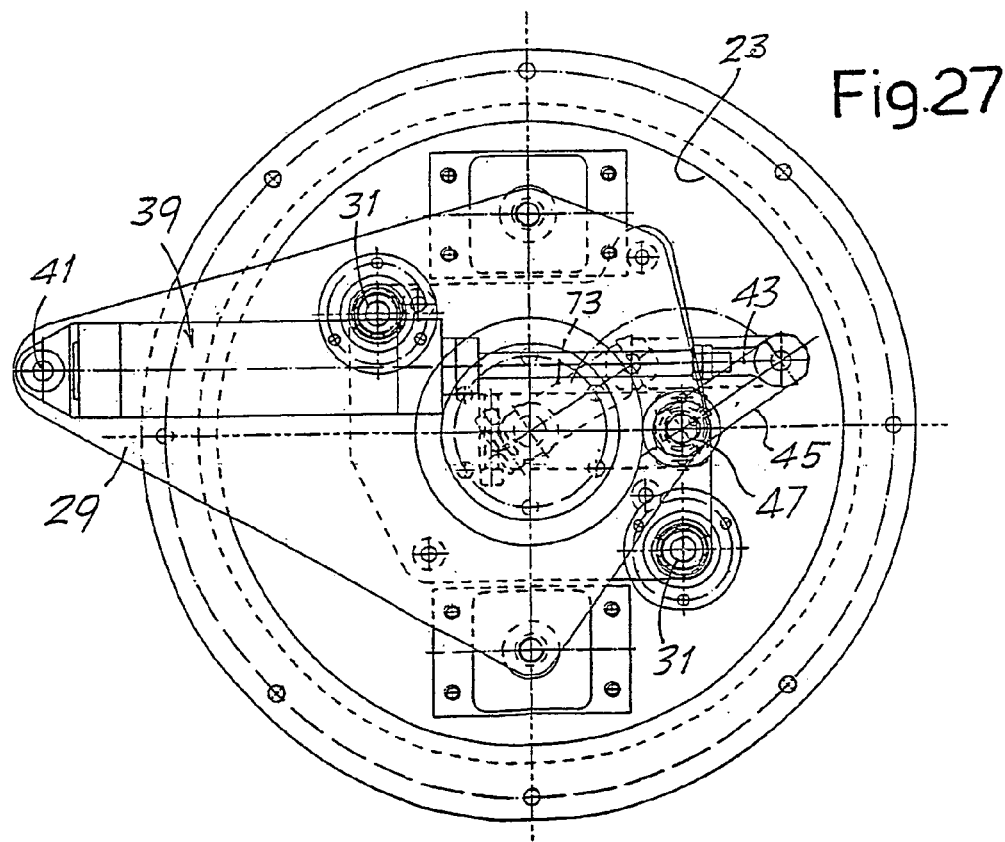
Figure 32:
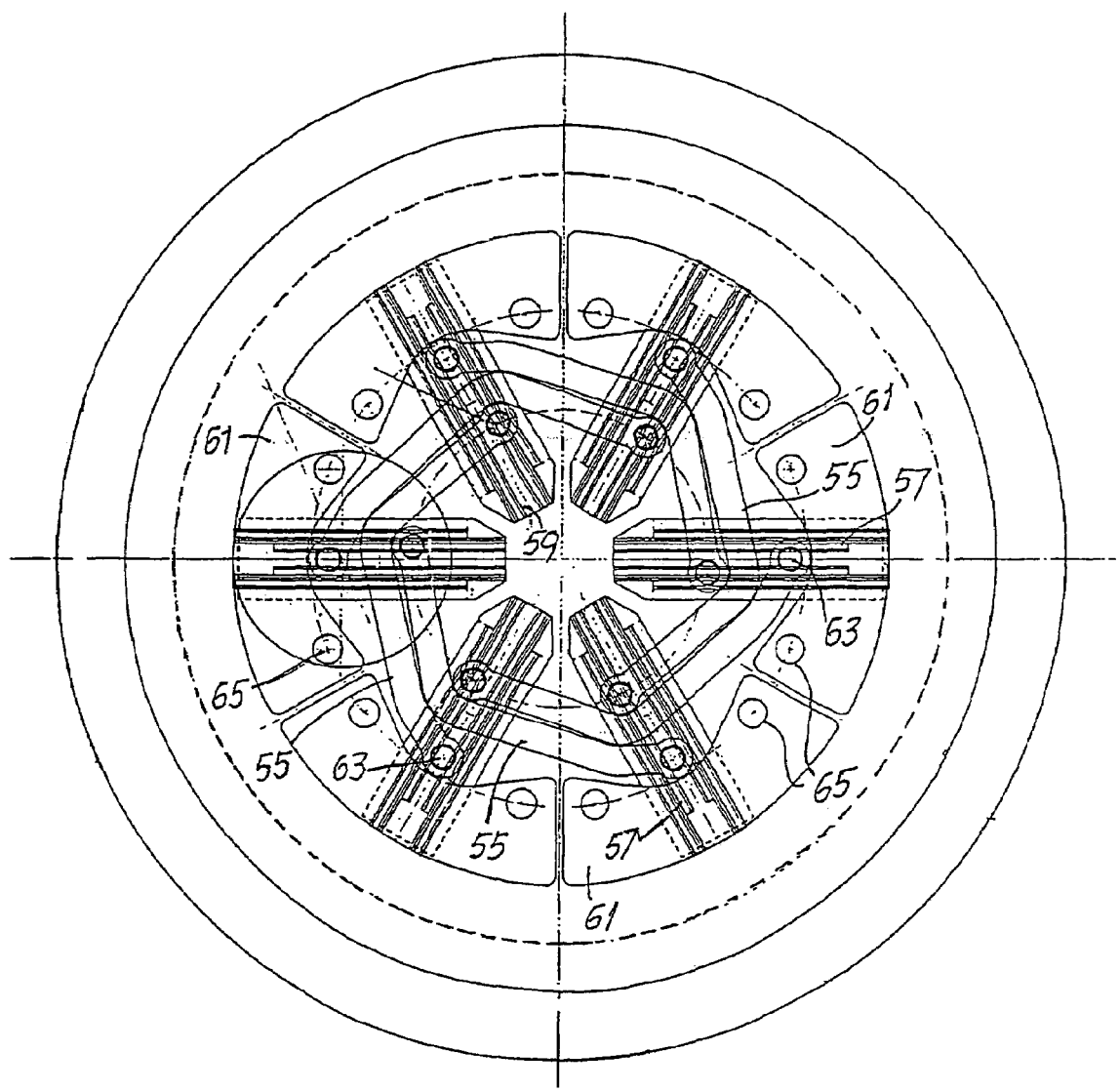
FIGS. 32, 33 and 34 show partial enlargements of FIGS. 22 and 24 and of the dilatable discoidal elements.
Figure 33:
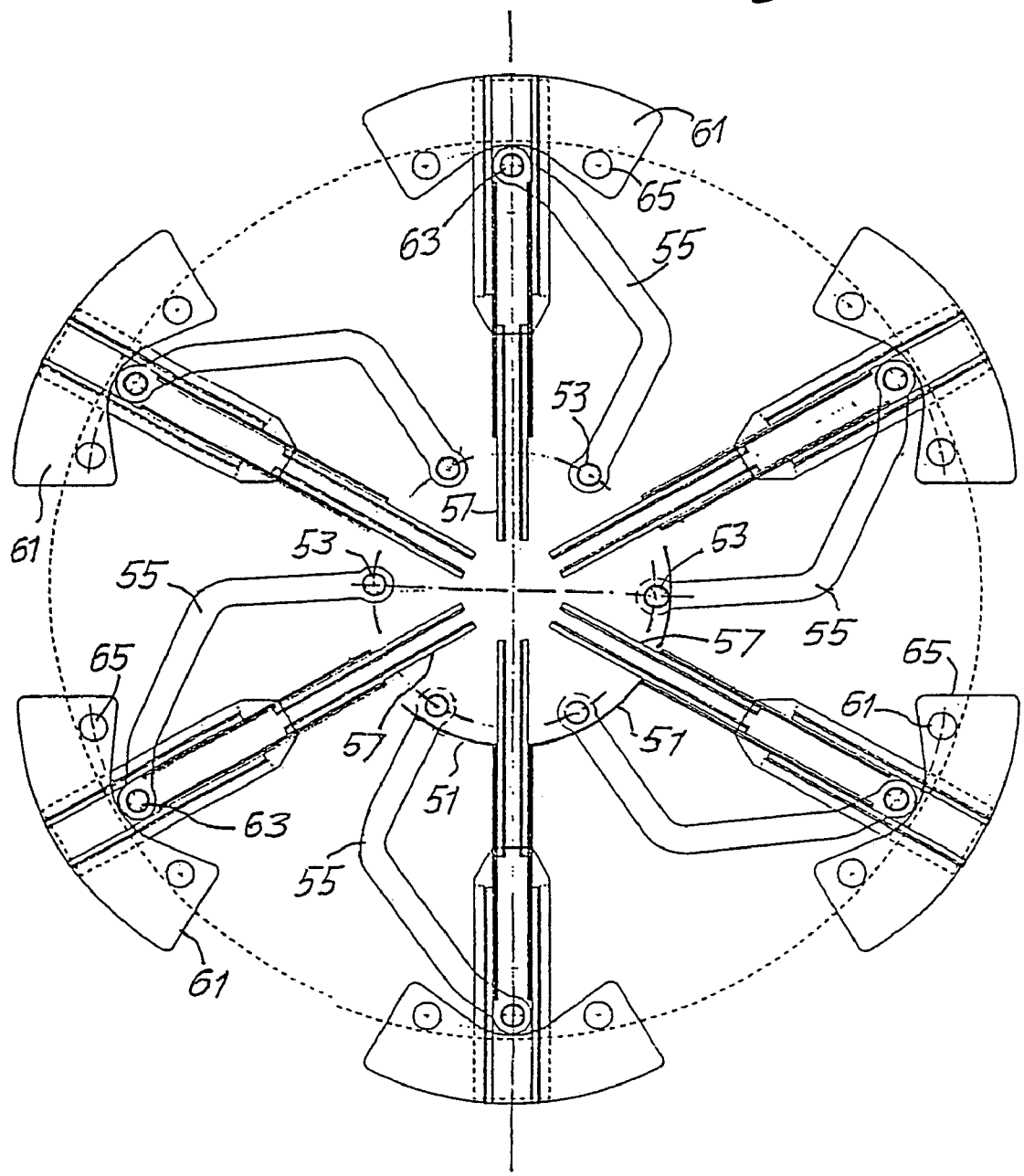
Figure 34:
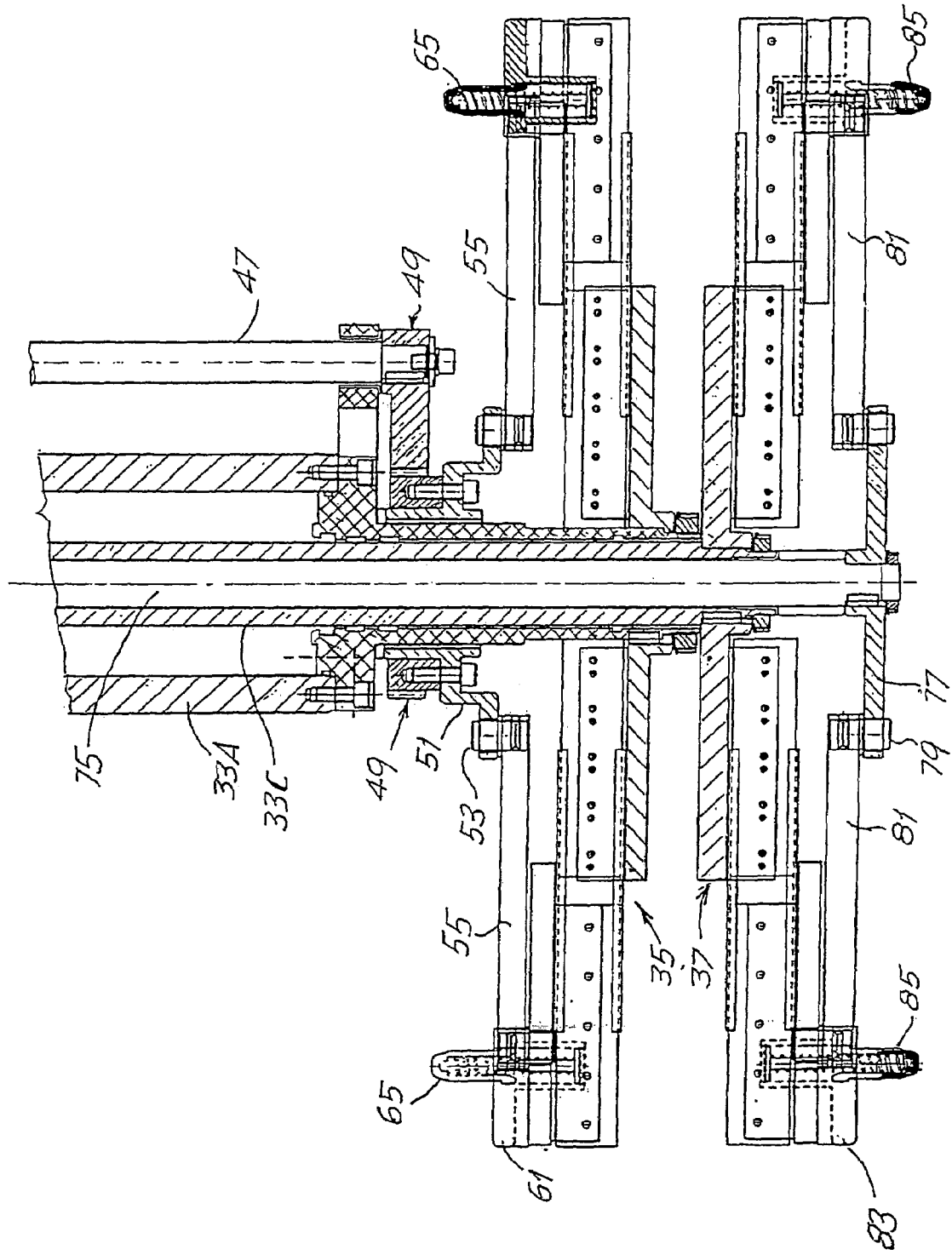
Figure 35:
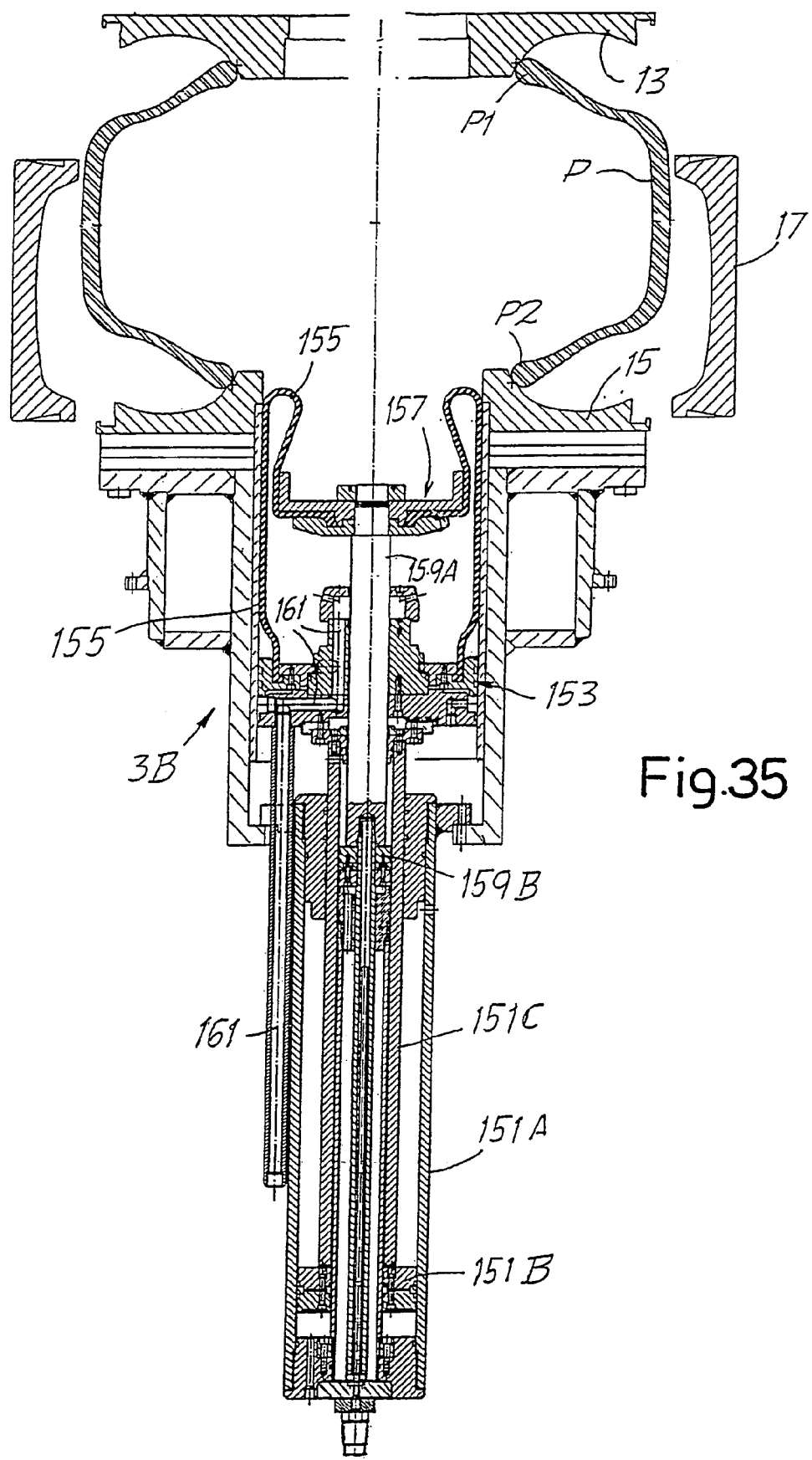
FIGS. 35–44 show a first elastic bladder system for applying the internal compression for curing and unloading in the various stages of the relevant cycle.
Figure 36:
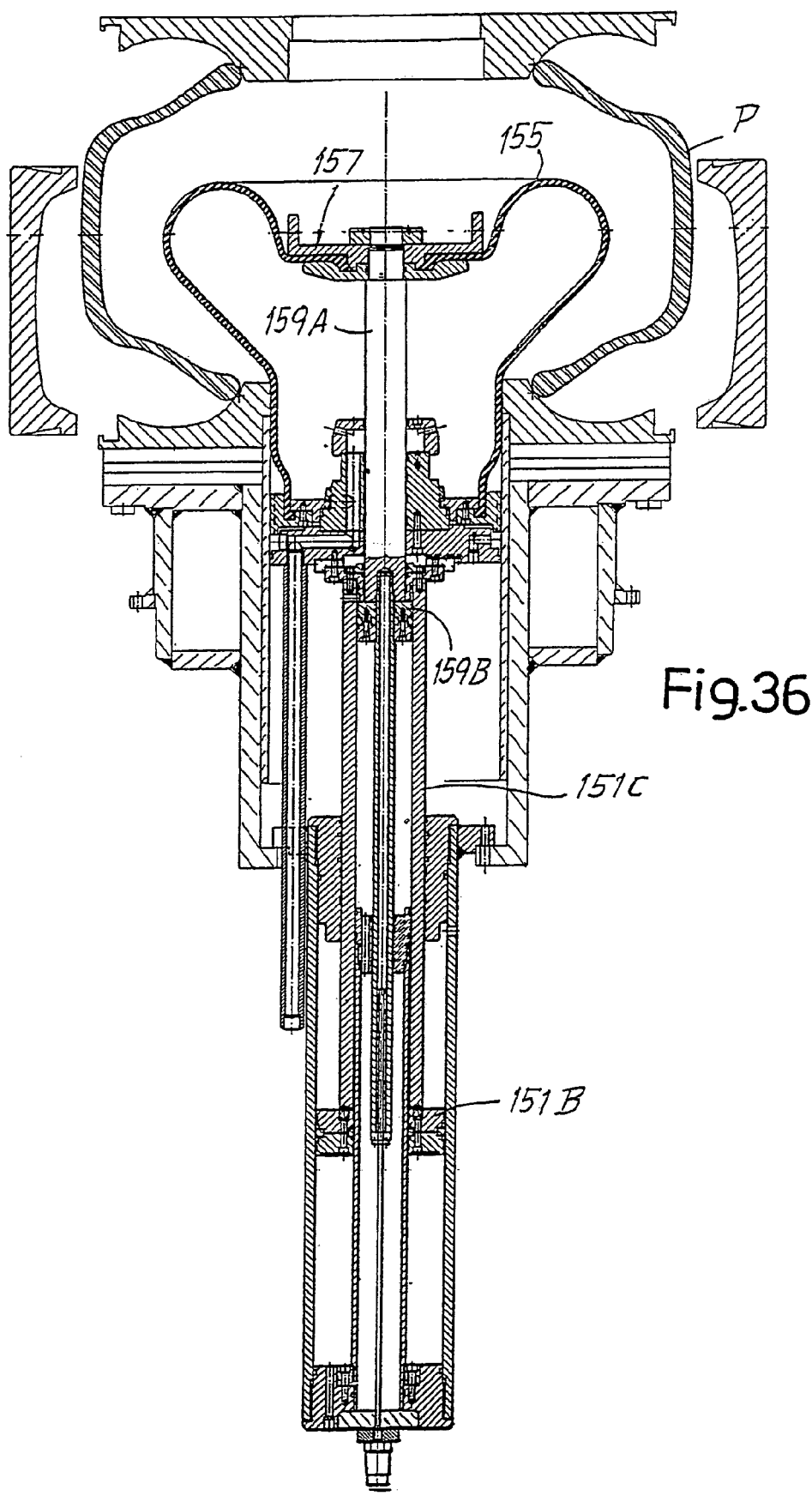
Figure 37:
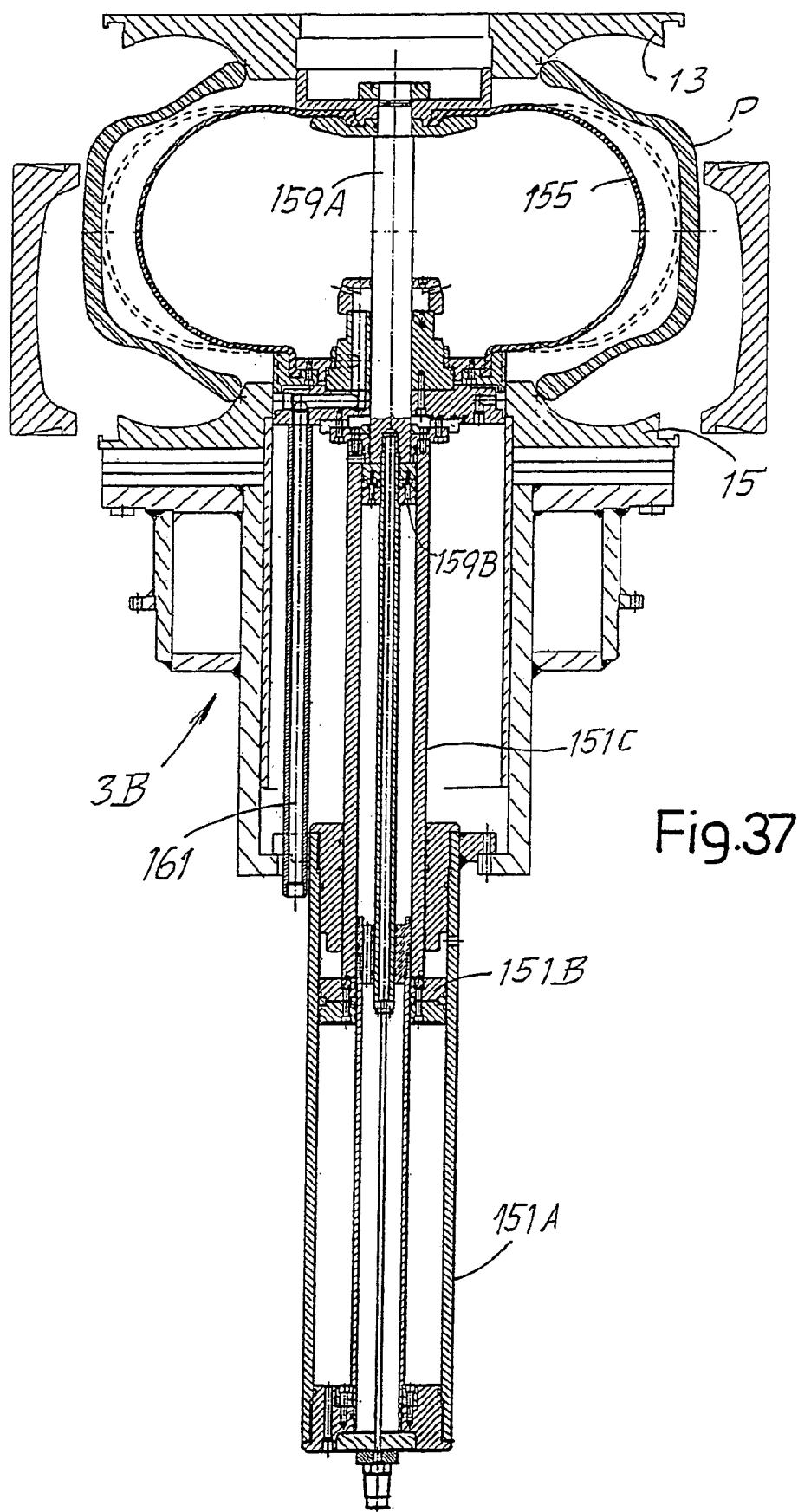

FIGS. 22, 24 and 26 indicate the positions adopted by the sectors 61 and sectors 83 in the conditions of smallest diametrical dimension, which is very close to the maximum diametrical dimension, and of maximum diametrical dimension; FIGS. 32 and 33 show enlargements of FIGS. 22 and 23, and FIG. 24 corresponds to a position of enlargement of the sectors that are slightly less than the maximum illustrated in FIG. 26, for reasons indicated later.

Figure 5:
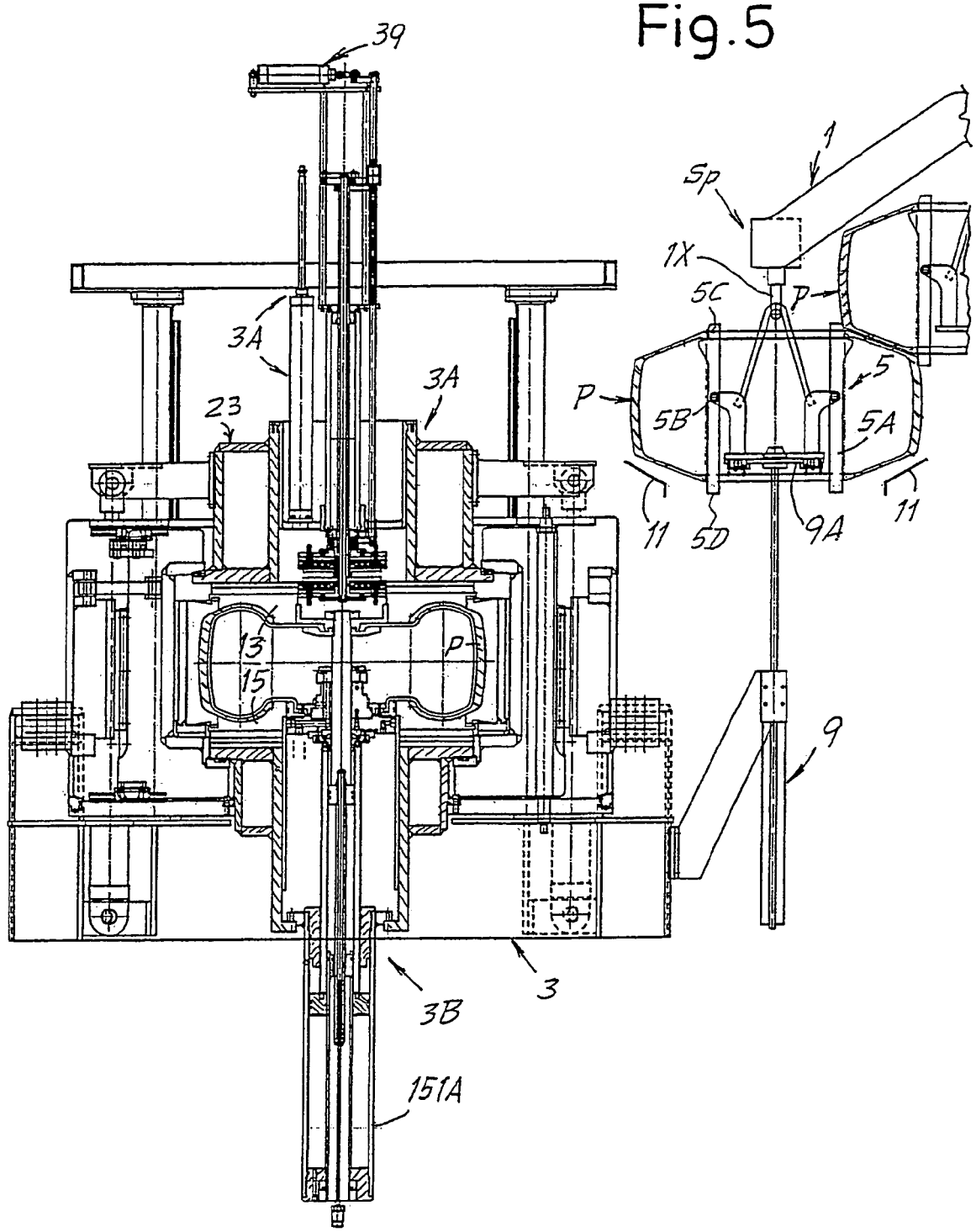
Figure 6:
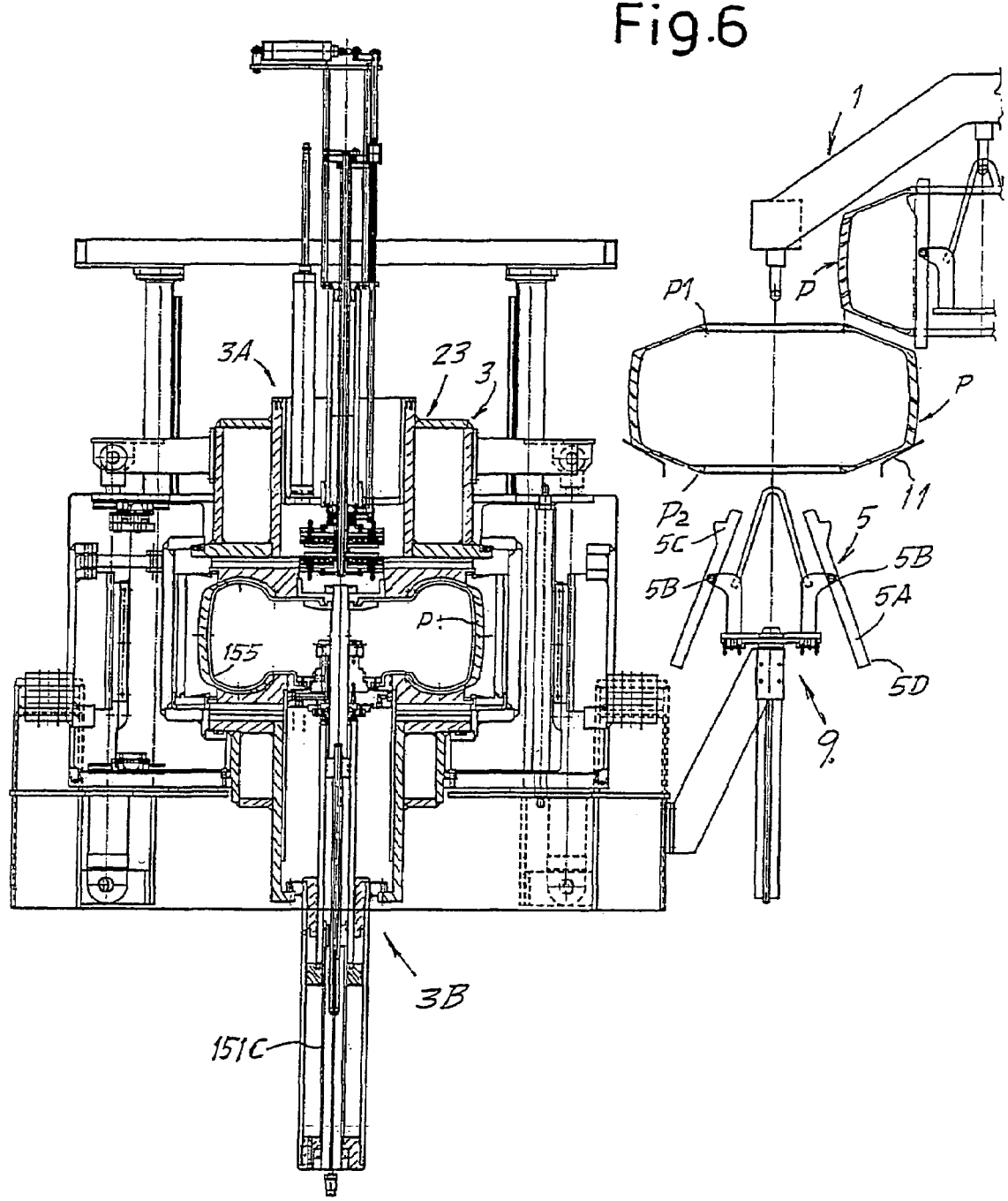
Figure 8:
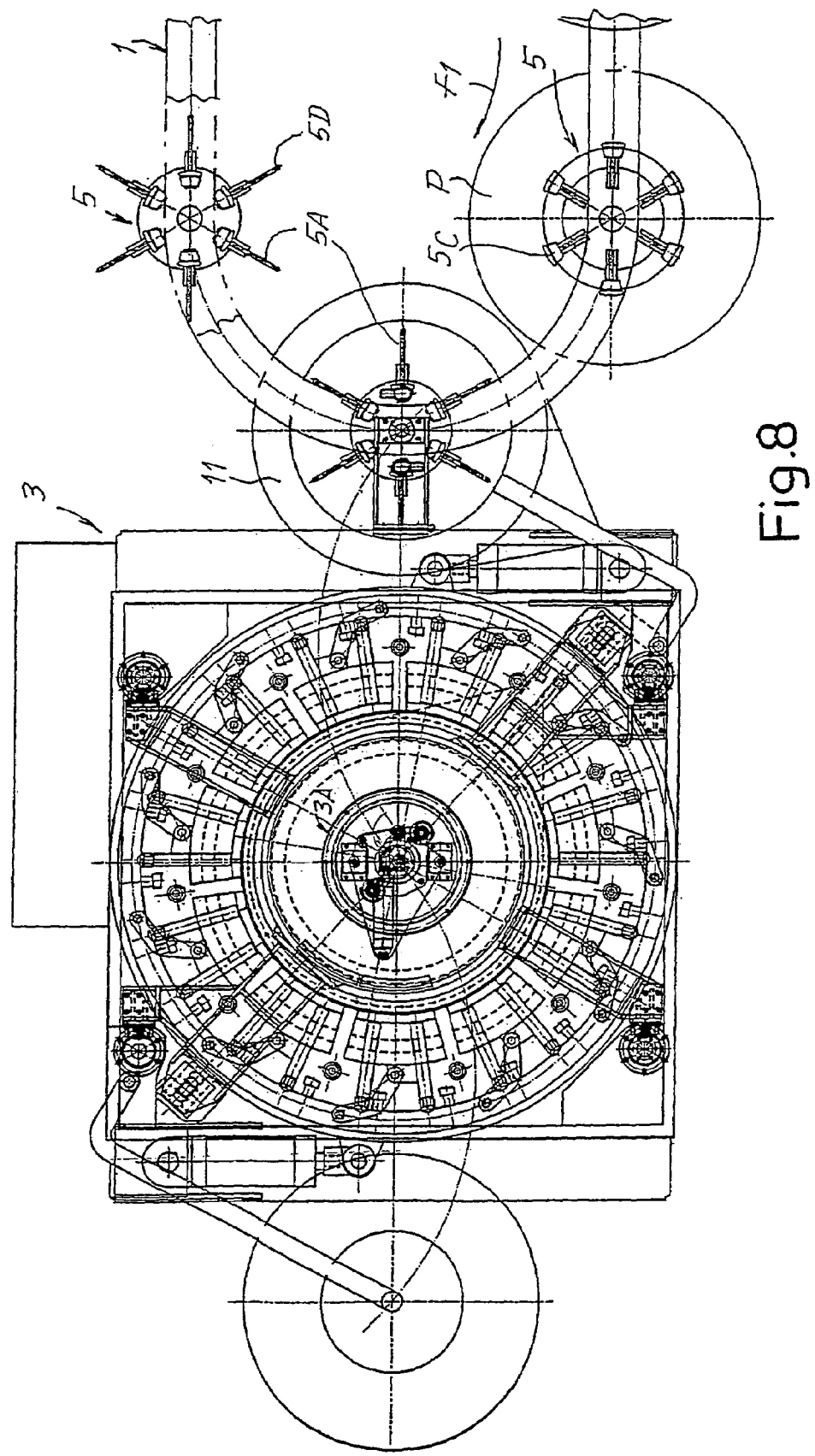
Figure 9:
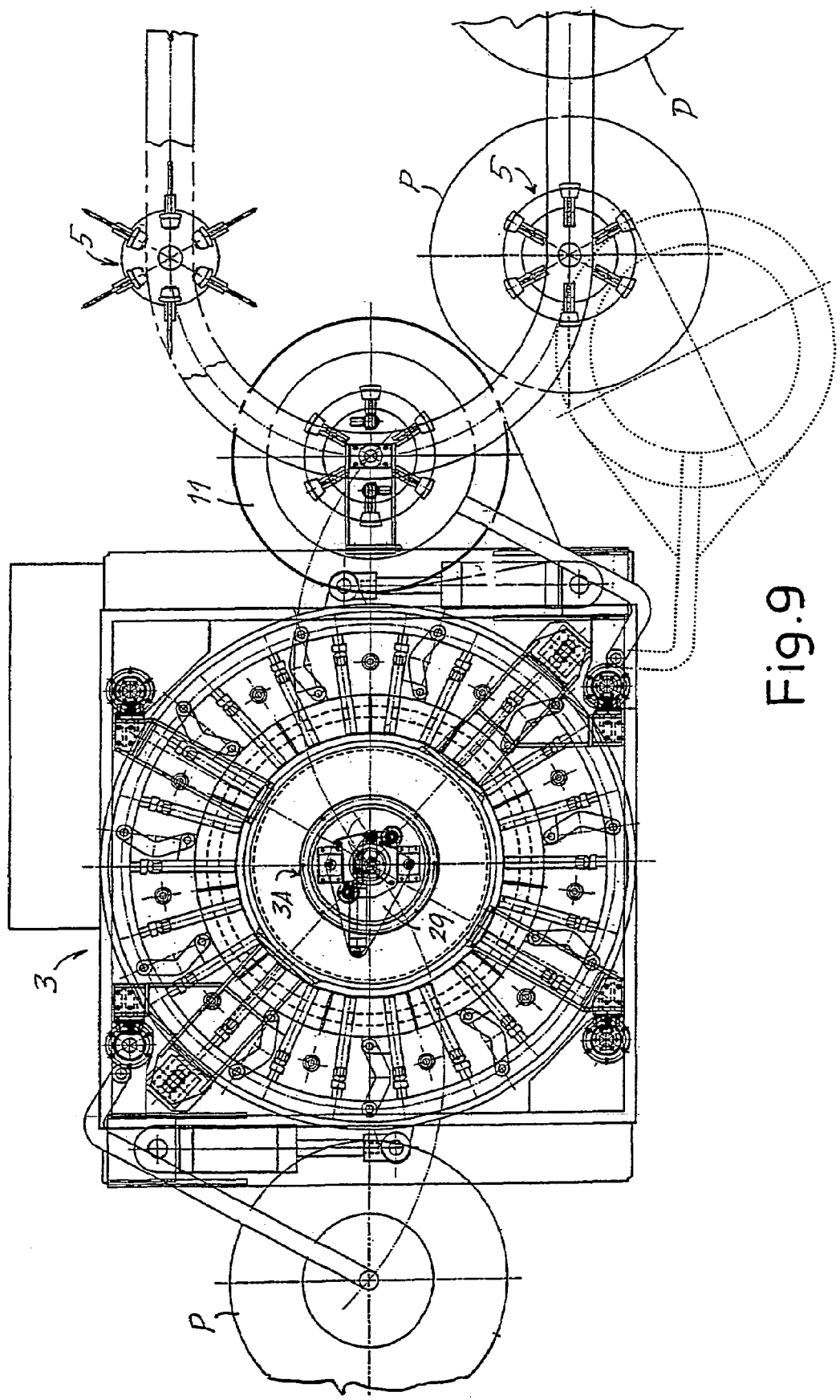
Figure 21:
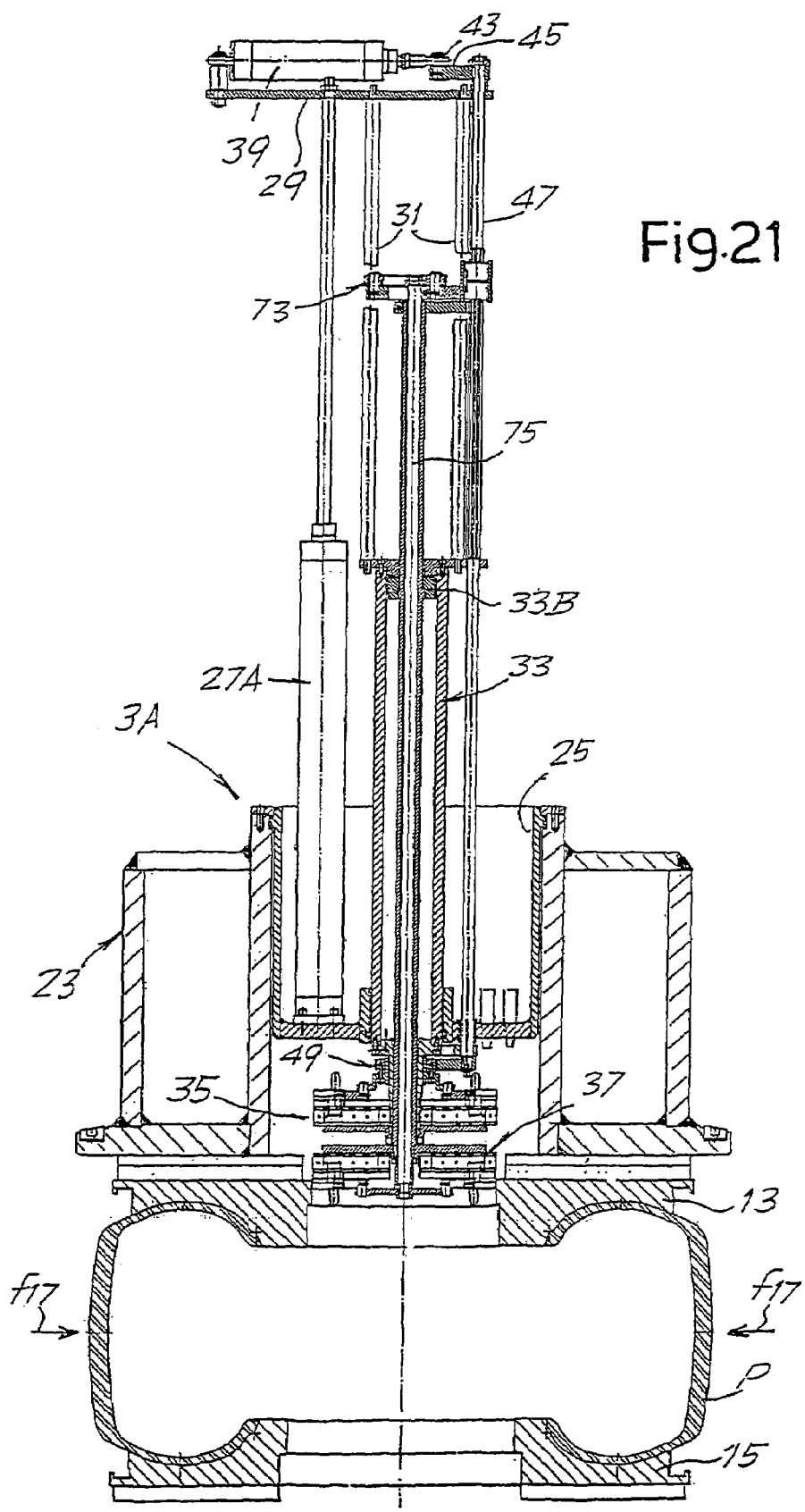

Referring more particularly to FIGS. 10–21, these show main stages in the operation, from loading of the green tire presented to the machine 3 as indicated in FIG. 1, to closure of the mold as shown in FIG. 5 and as shown also in FIG. 21 before the sectors 17 of the mold are moved in.

Figure 10:
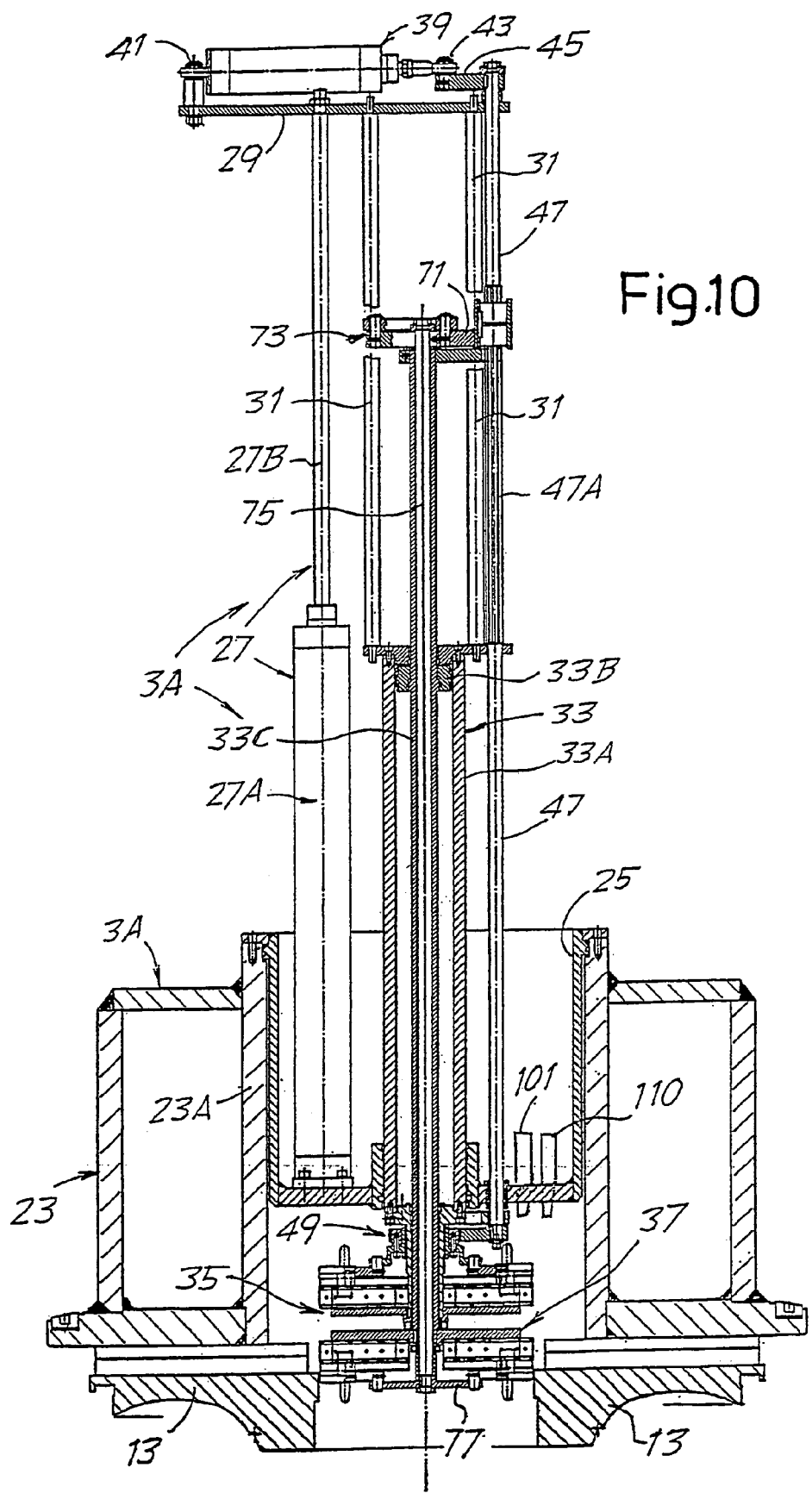
Figure 11:
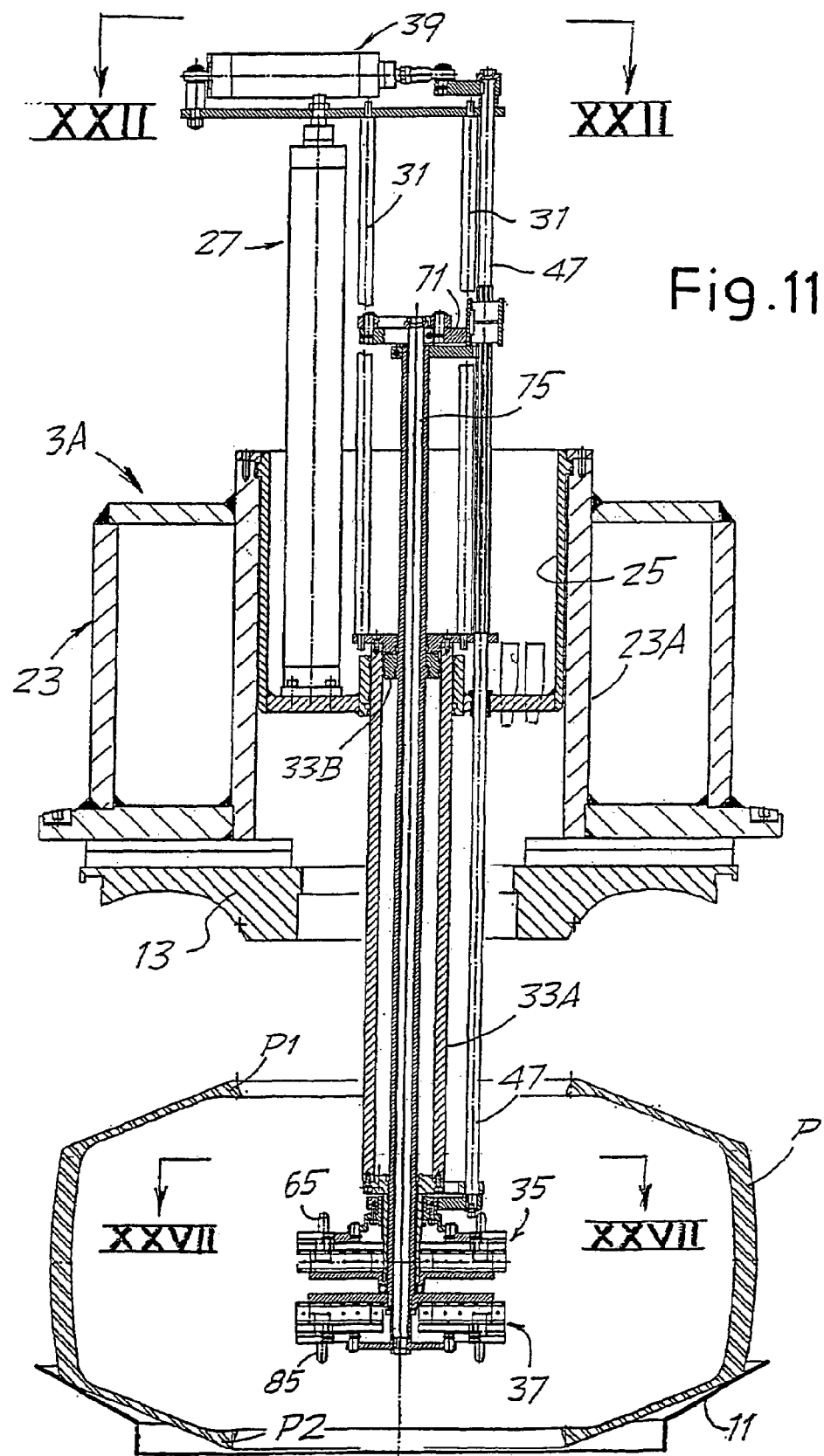
Figure 12:
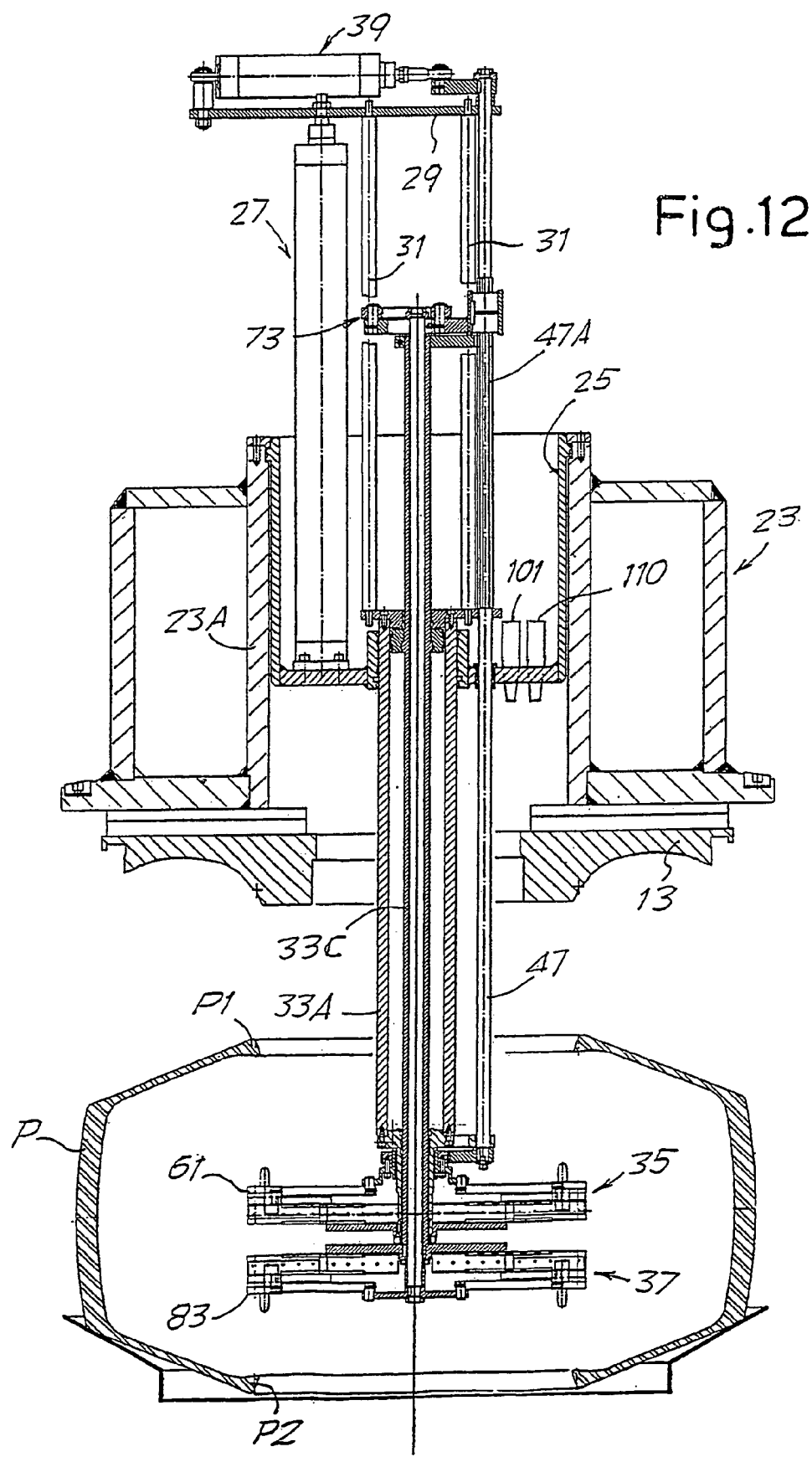
Figure 13:
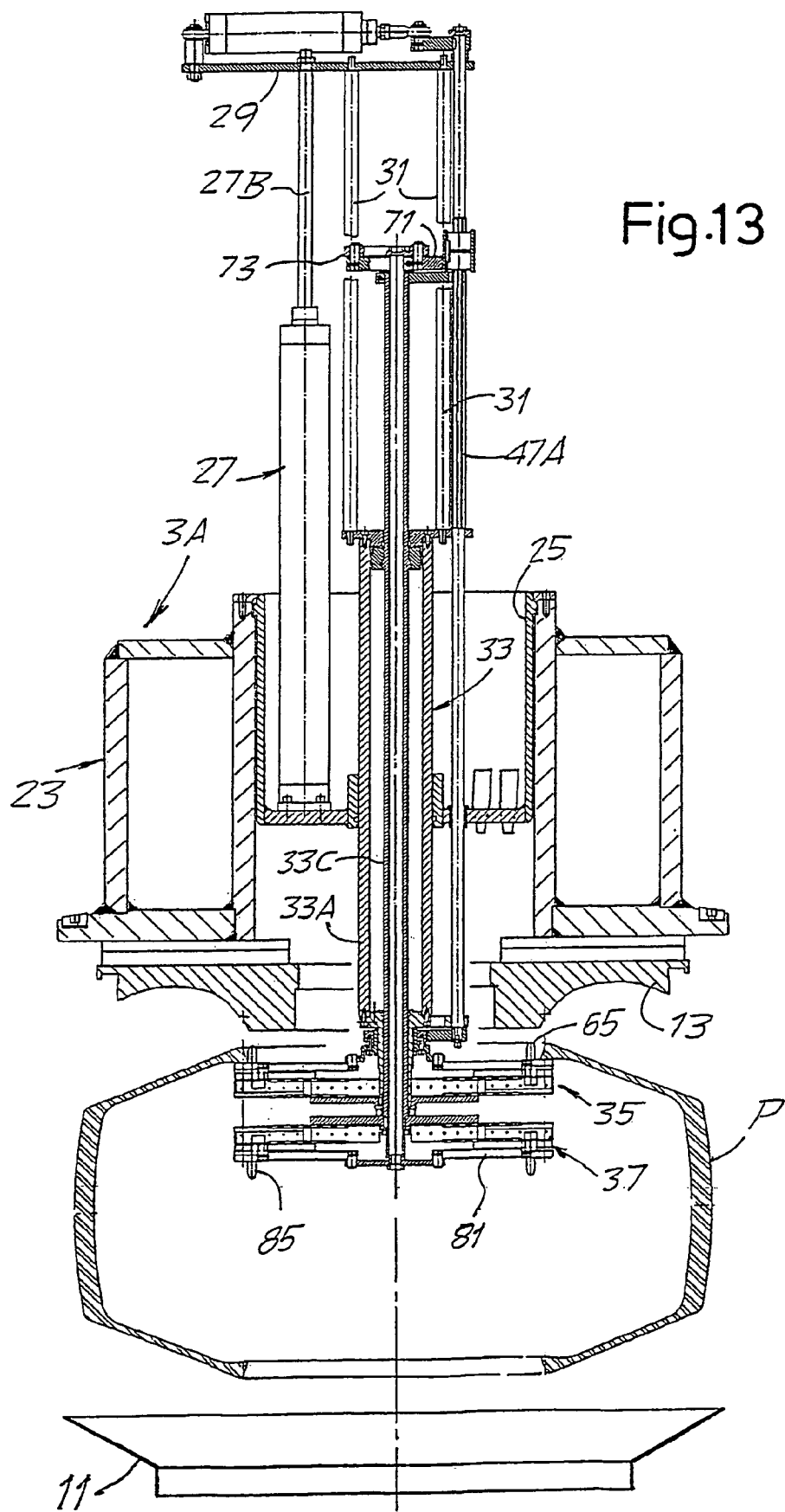
Figure 14:
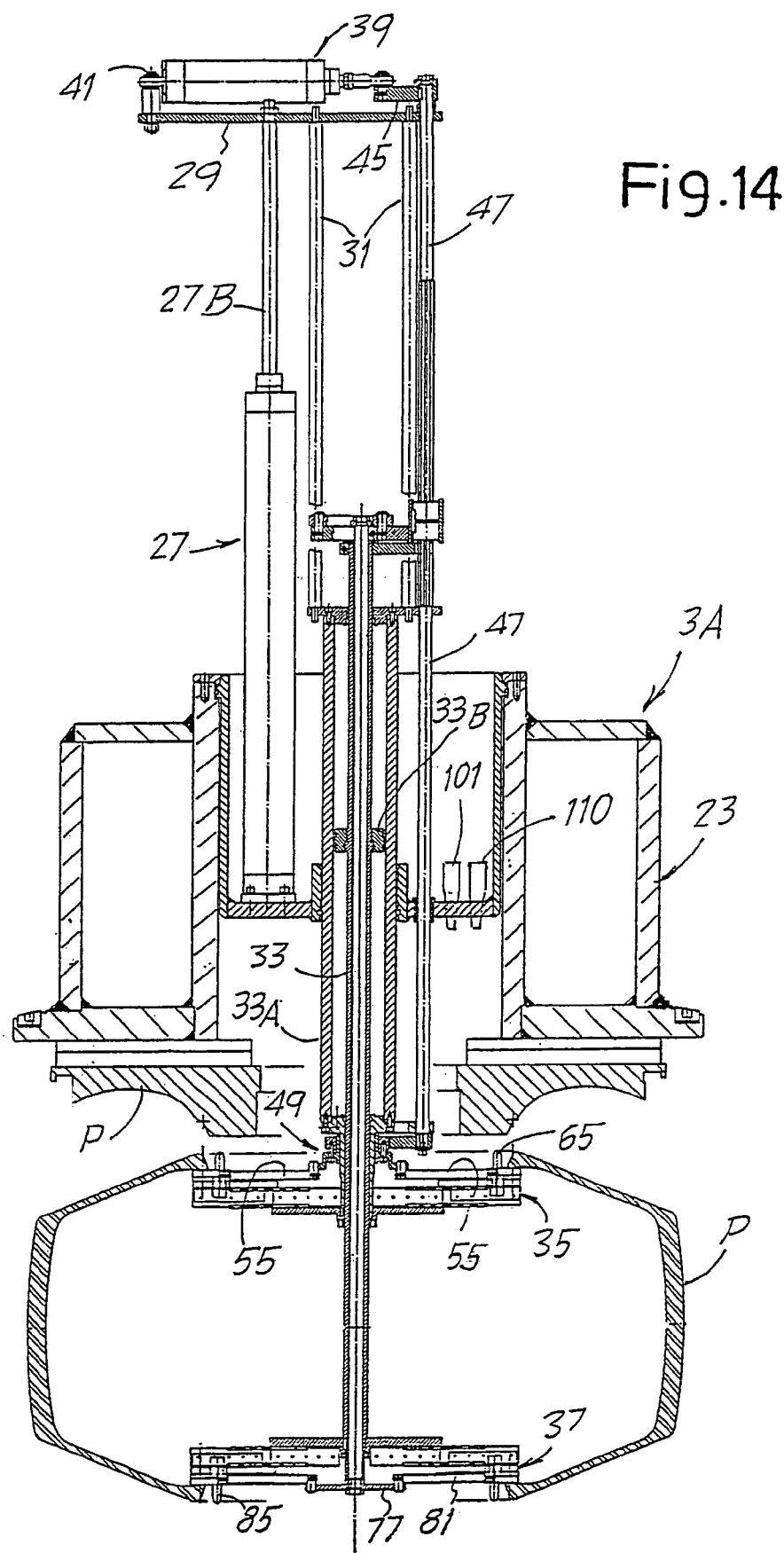
Figure 15:
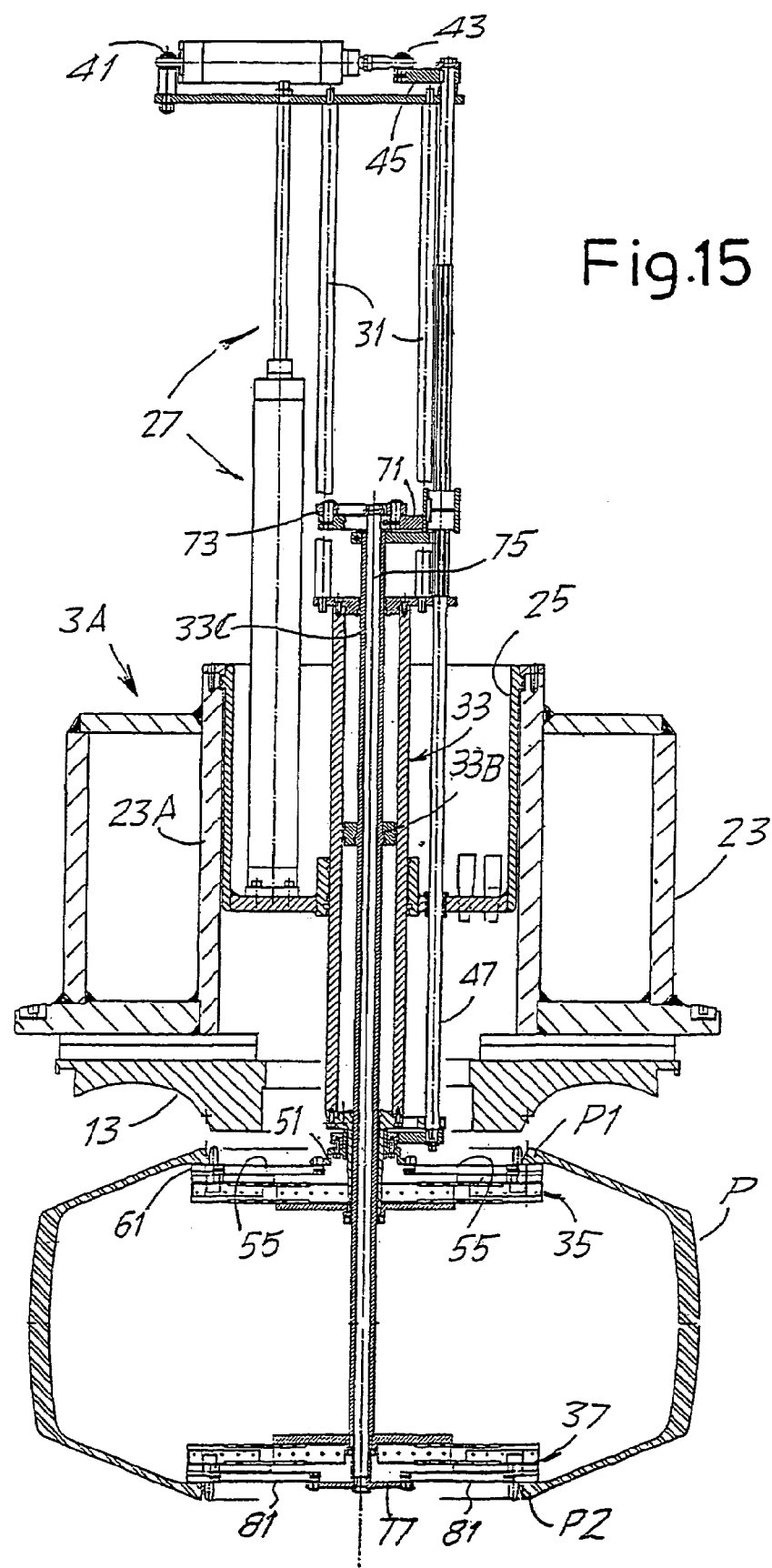

From the position shown in FIG. 1 and therefore also FIG. 10, this is referred to as an initial stage in which the two dilatable discoidal elements 35 and 37 are withdrawn between the bottom of the cup 25 and the upper pan or end plate 13 of the mold. The green tire P is positioned by the annular pan 11 in the position shown in FIG. 11. In the second stage the actuator 27 lowers the assembly of the two dilatable disks 35 and 37 into the tire P. In the third stage, FIG. 12, the actuator 39 causes an initial dilation of the discoidal elements 35 and 37, moving the sectors 61 and 83 to an almost but not quite fully dilated position: in this position the sectors 61 and 83 are capable of reaching the beads P1 and P2 of the tire P in order to position themselves inside them. In the fourth stage shown in FIG. 13, the actuator 27 raises both discoidal elements 35 and 37, still close to each other, until the sectors 61 touch the annular bead P1 of the tire, thus raising the tire until it almost reaches the pan or end plate 13. The bead P1 is at a slight distance from the pegs 65 but resting on the sectors 61, in a condition which need not actually be perfectly concentric. In the fifth stage shown in FIG. 14, the actuator 33, 33A, 33B separates, that is lowers, the discoidal element 37 from the discoidal element 35 until the sectors 83 contact the lower bead P2 of the tire P, pushing it slightly away from the annular bead P1. Again, the annular bead P2 need not be perfectly concentric with the discoidal element 37, as already mentioned with regard to the upper bead P1. In the next or sixth stage shown in FIG. 15, the actuator 39 turns the shaft 47 further in the same direction as before to complete the dilation of the discoidal elements 35 and 37: this places the pegs 65 and the pegs 85 in contact with the beads P1 and P2, respectively, so that the beads P1 and P2 and therefore the green tire P are exactly central with respect to the upper assembly 3A of the machine 3 and therefore with respect to the machine structure and to all the components of the mold 13, 15 and 17. In the seventh stage shown in FIG. 16 the actuator 27 causes a further limited upward movement of the discoidal element 35 to place the bead P1 of the tire in its exact position against the corresponding profile of the pan or end plate 13 of the mold. In the next or eighth stage shown in FIG. 17, the lower pan or end plate 15 of the mold is moved up into contact with the lower bead P2 of the tire P, which bead P2 has been positioned centrally by the pegs 85 of the discoidal element 37 because of the final centrifugal movement of the sectors 83, in the same way as for the upper bead P1. In this situation the tire is in complete contact with both pans or end plates 13 and 15 of the mold and exactly coaxial with them. In the next or ninth stage shown in FIG. 18, the two discoidal elements 35, 37 are moved slightly toward each other, away from the beads P1 and P2 of the tire and the actuator 39 is used to reduce the diametrical dimension of the discoidal elements 35 and 37 by centripetal movement of the sectors 61 and 83, resulting in the tenth stage shown in FIG. 19, in which the discoidal elements 35 and 37 are returned to the minimum diametrical dimension. Hence in the eleventh stage for the discoidal elements 35 and 37, they can be pulled back up under the bottom of the cup 25. After this the pan or end plate 15 of the mold is moved into the position of closure of the mold as seen in FIG. 21, following which mold closure is completed by the sectors 17 advancing in the direction of arrows f17 in FIG. 21 to close the mold and allow curing to be carried out.

Figure 16:
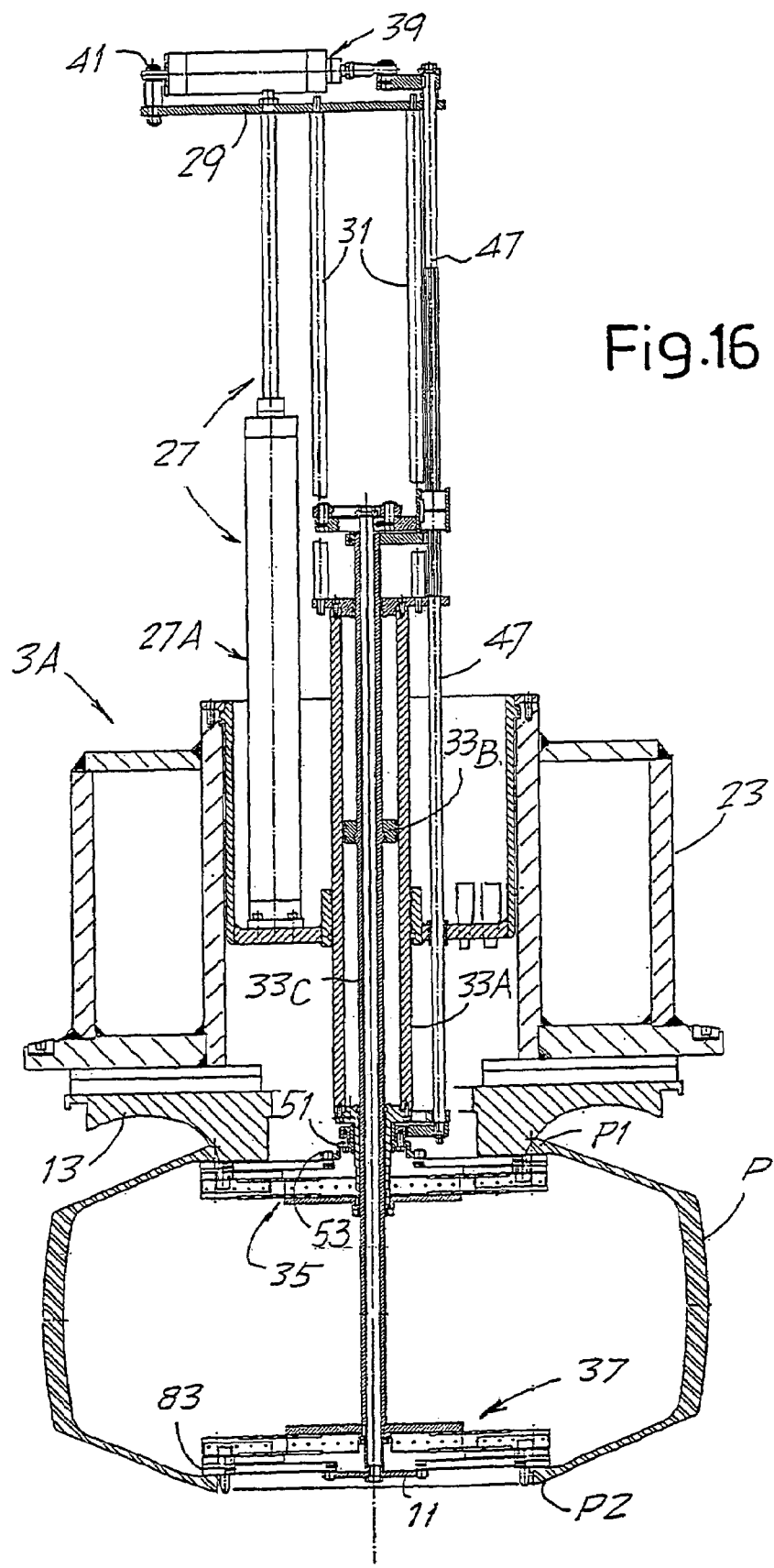
Figure 17:
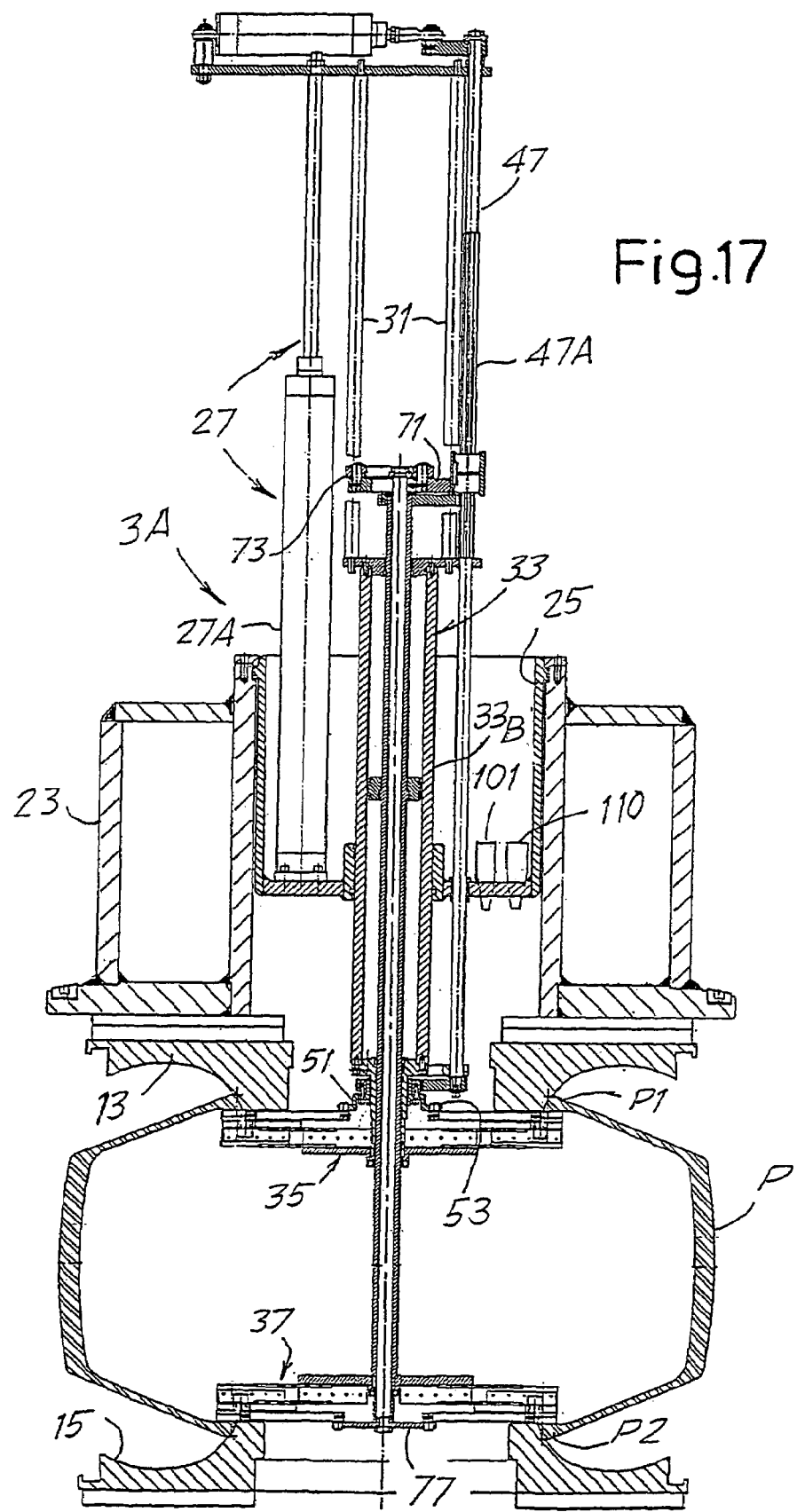
Figure 18:
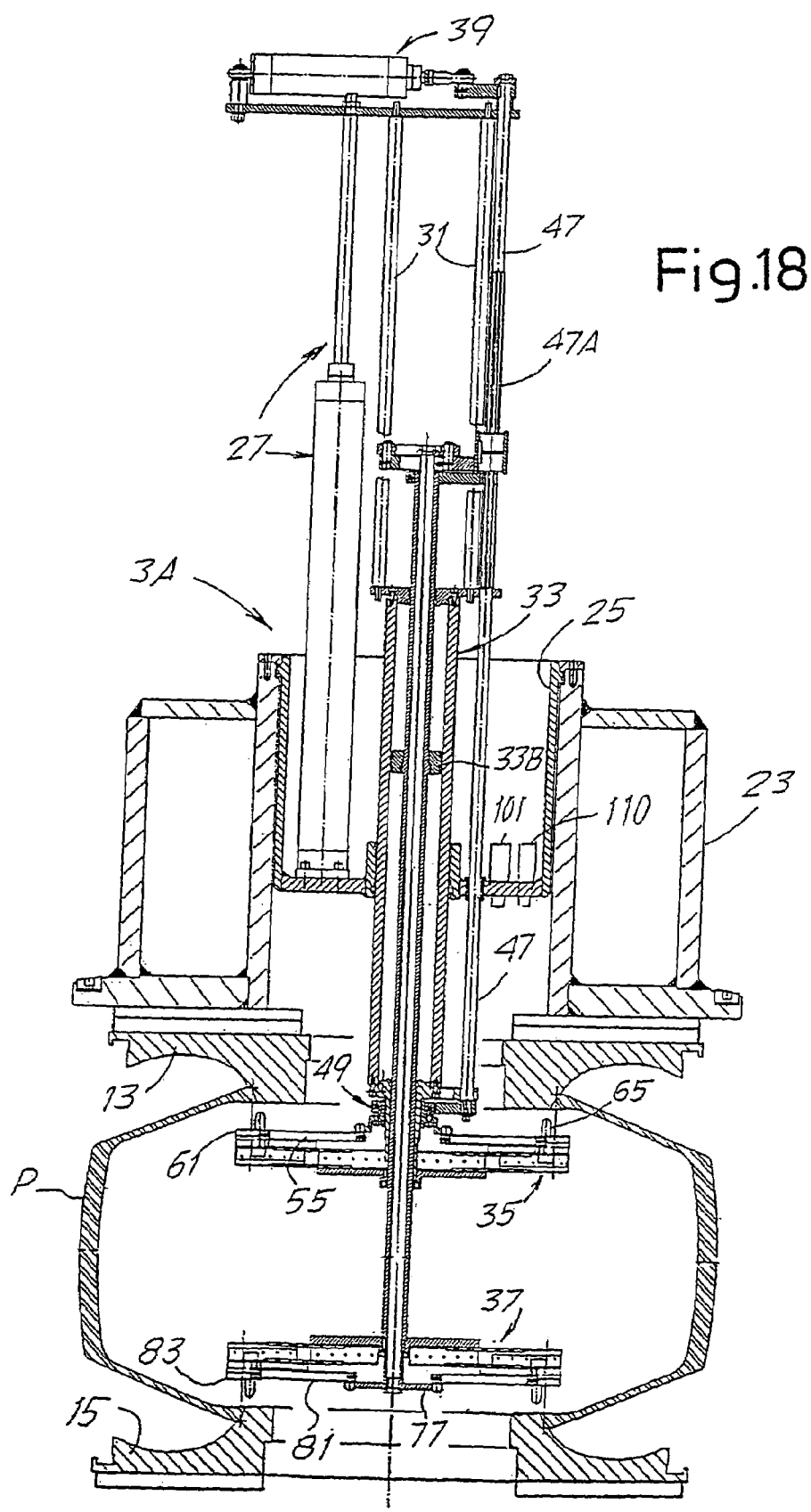
Figure 19:
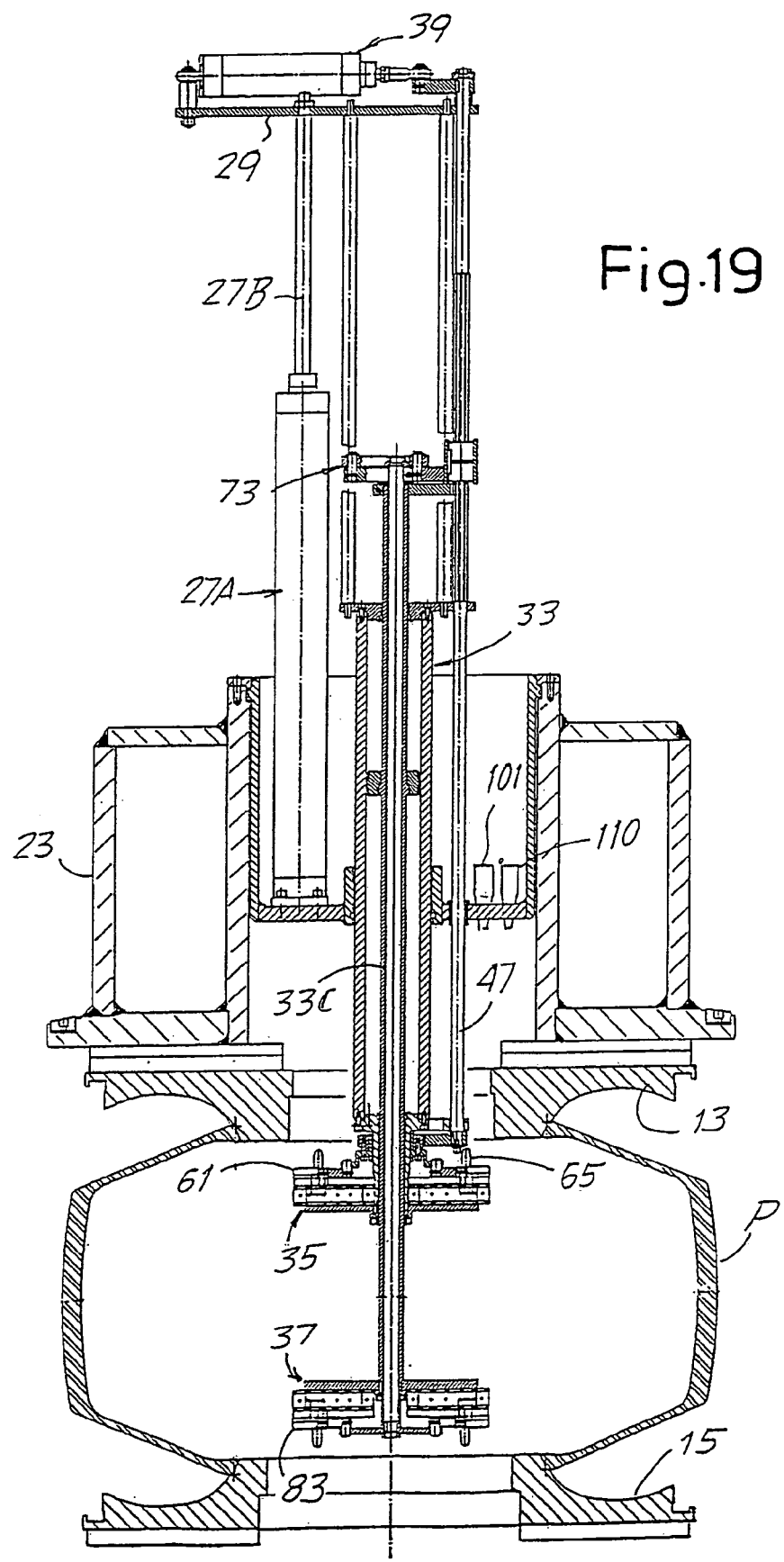
Figure 20:
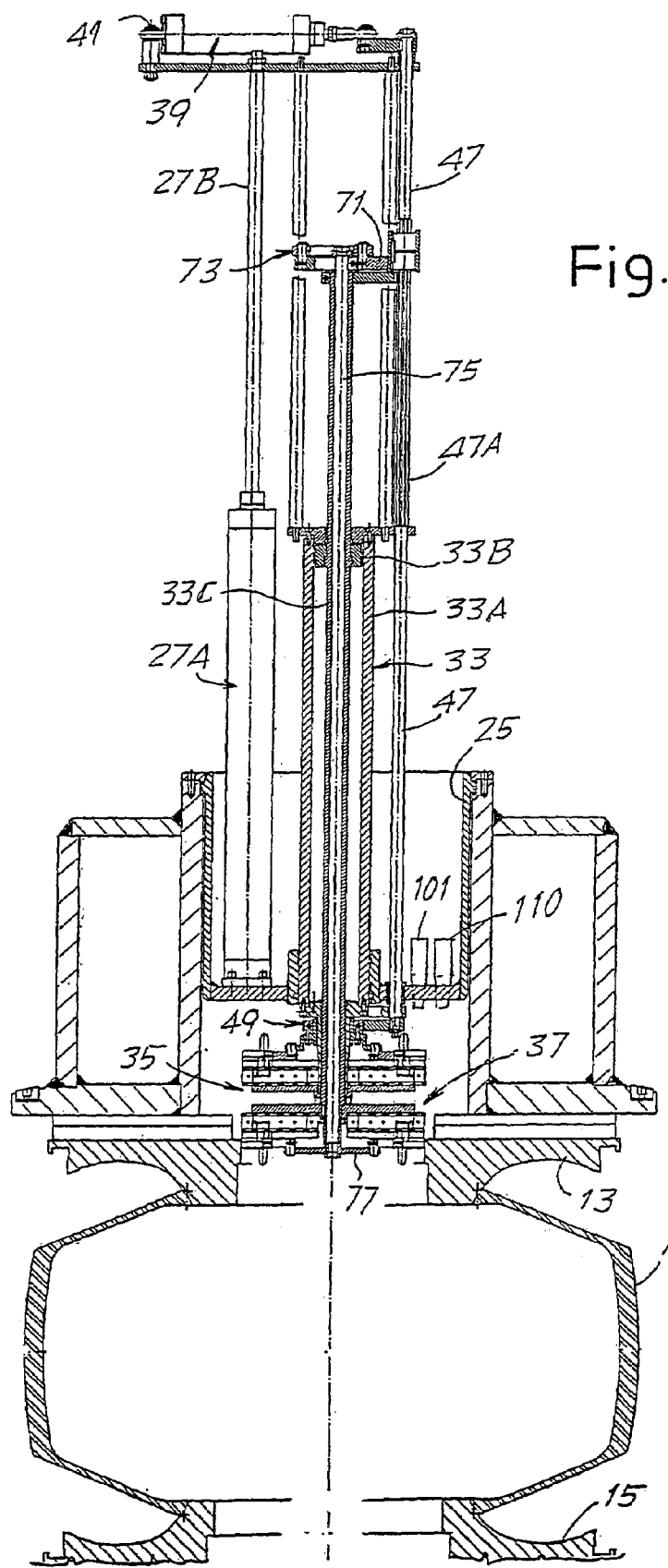

During the stages shown in FIGS. 16, 17 and 18 a "shaping" gas is fed into the inside of the tire to stabilize the position of the green tire against the pans or end plates 13 and 15 of the mold so that the green tire P is maintained in the condition in which it was placed by the discoidal elements 35 and 37 as described above.

Notice that when the annular edges or beads P1, P2 of the tire are placed against the corresponding pans or end plates 13 and 15, said beads continue to be guided by the spring-loaded pegs 65 and 85, which gradually withdraw into their respective sectors 61 and 83 as they abut against the pans or end plates 13 and 15.

The slight pressure of shaping gas inside the tire in the conditions shown in FIGS. 16, 17 and 18 is obtained by supplying the shaping gas from a unit 101 outlined in the drawing and particularly in some of the figures, while 109, 110, 111 are general references for means for discharging the fluids from inside the tire for the shaping action and for the compression inside the tire, which is effected by an elastically dilatable sucker means for establishing the high curing pressure inside the tire, in the mold in which the tire is to be cured, as will be described later in two different embodiments. This gas supply through the unit 101 and this discharge through the unit 110 will take place promptly at the moment when the beads P1 and P2 contact the two pans or end plates 13 and 15, to ensure this contact takes place until the inside of the tire has gradually filled with the elastic bladder means, which must reach the high pressures to bring about the compression inside the tire for curing to take place. The elastic bladder must be allowed to dilate by removing the shaping gas at the correct rate.

The use of the dilatable discoidal elements, the slight pressure of the "shaping" gas and the subsequent dilation of the elastic bladder ensures that the tire P (which is in its green state and therefore very weak) is exactly central relative to the mold in which it is to be cured.

Figure 28:
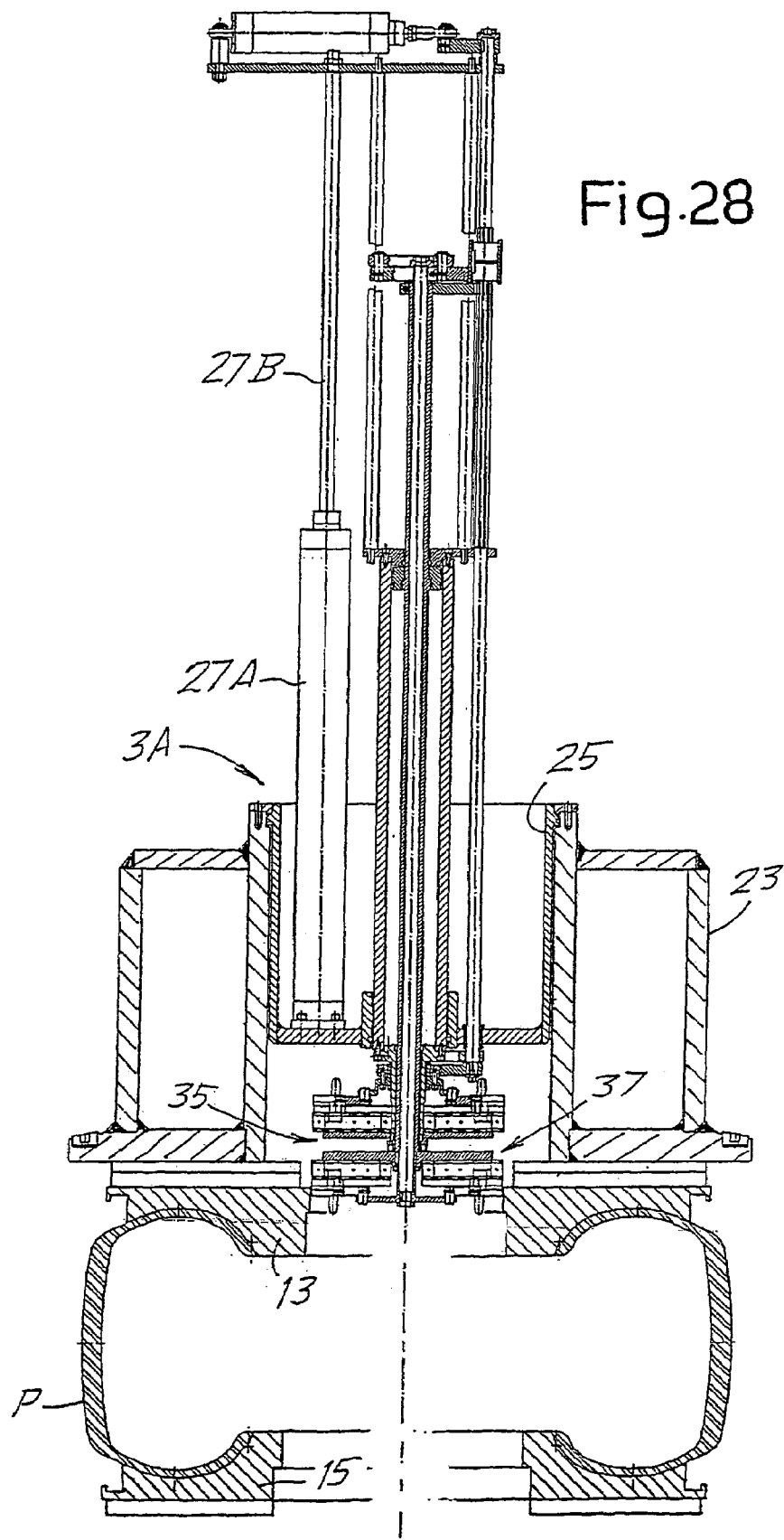
FIGS. 28–31 show, in a similar way to FIGS. 10–21, stages following the heat treatment for discharging the tire.
Figure 29:
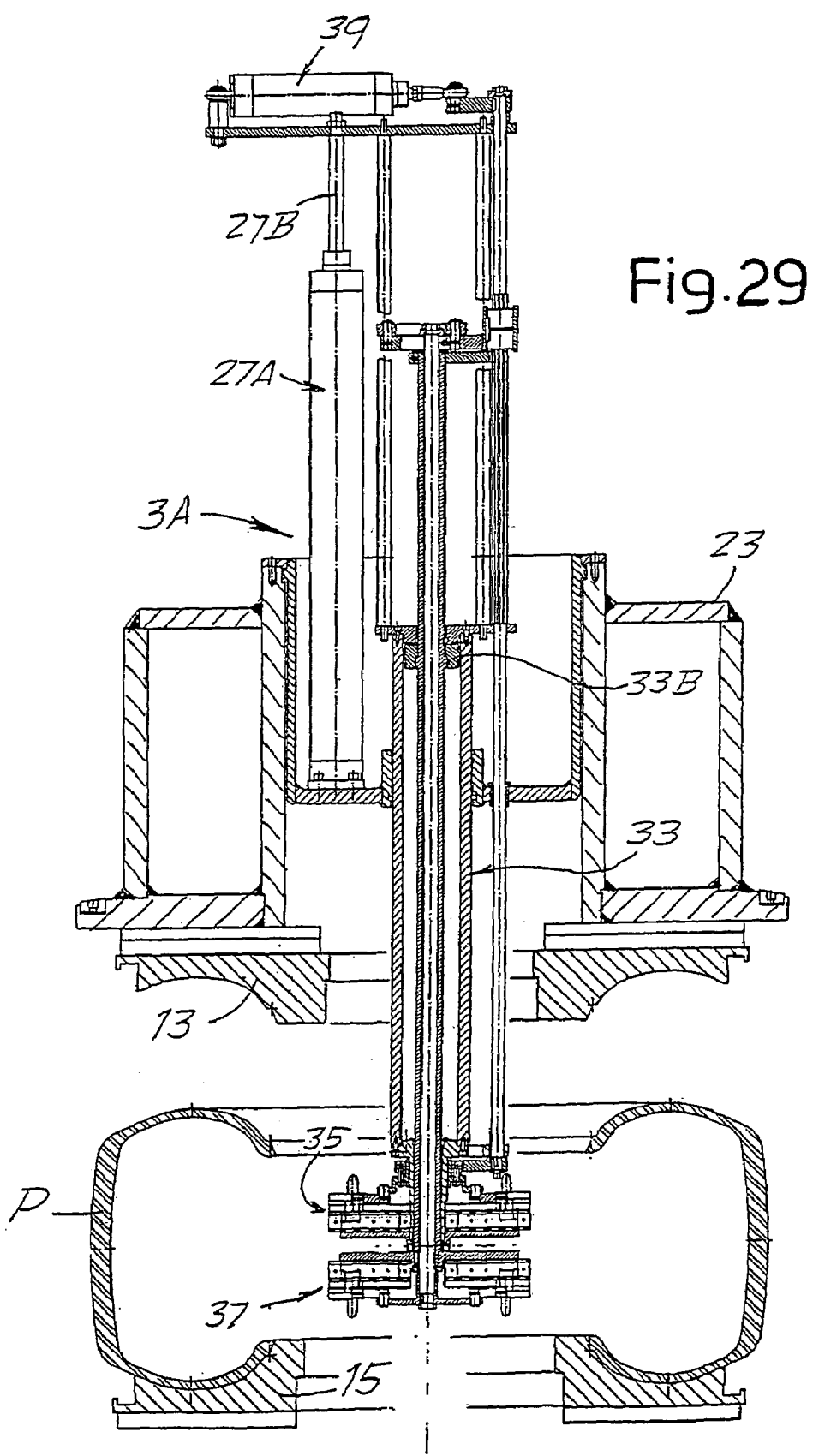
Figure 30:
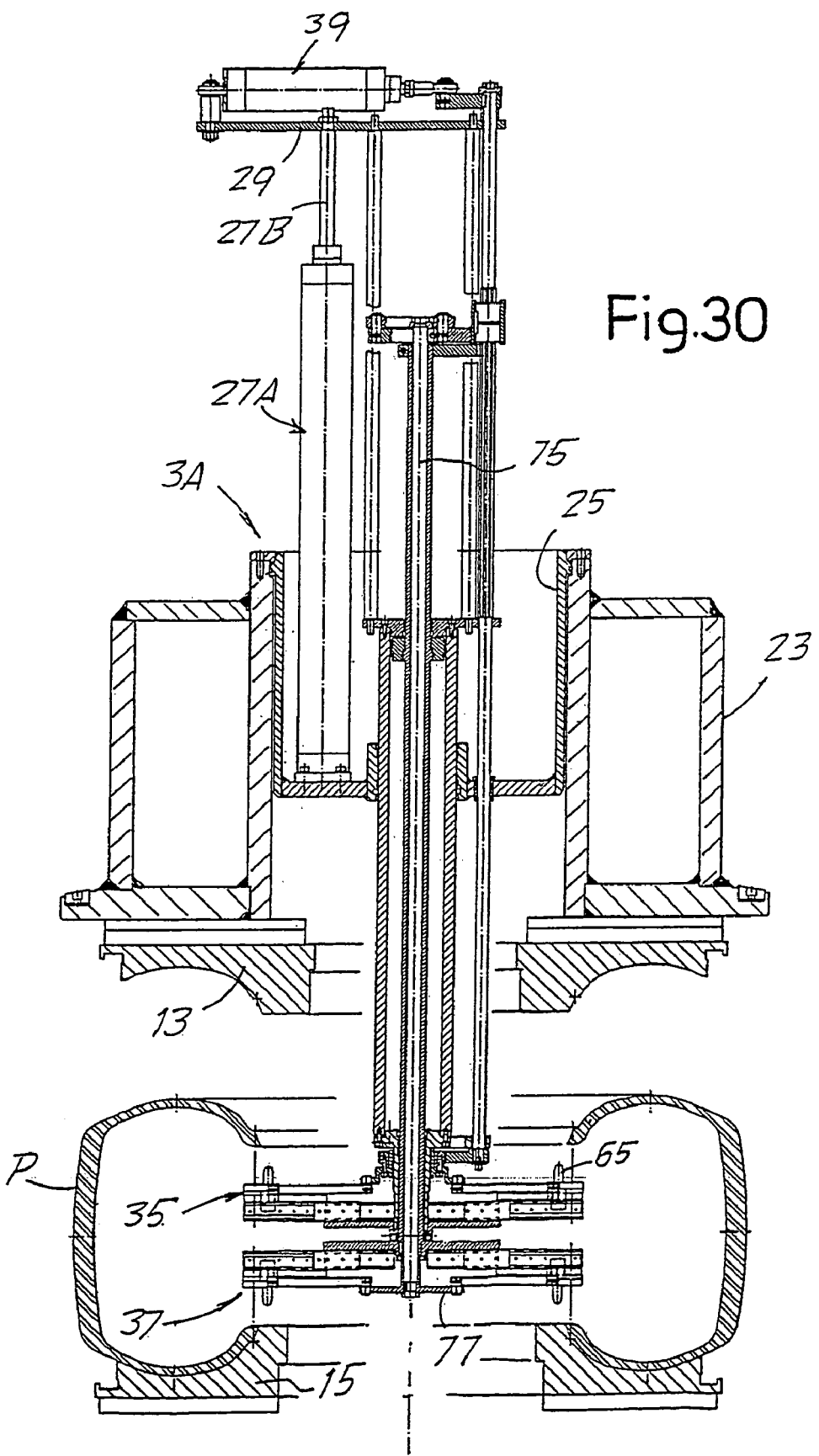
Figure 31:
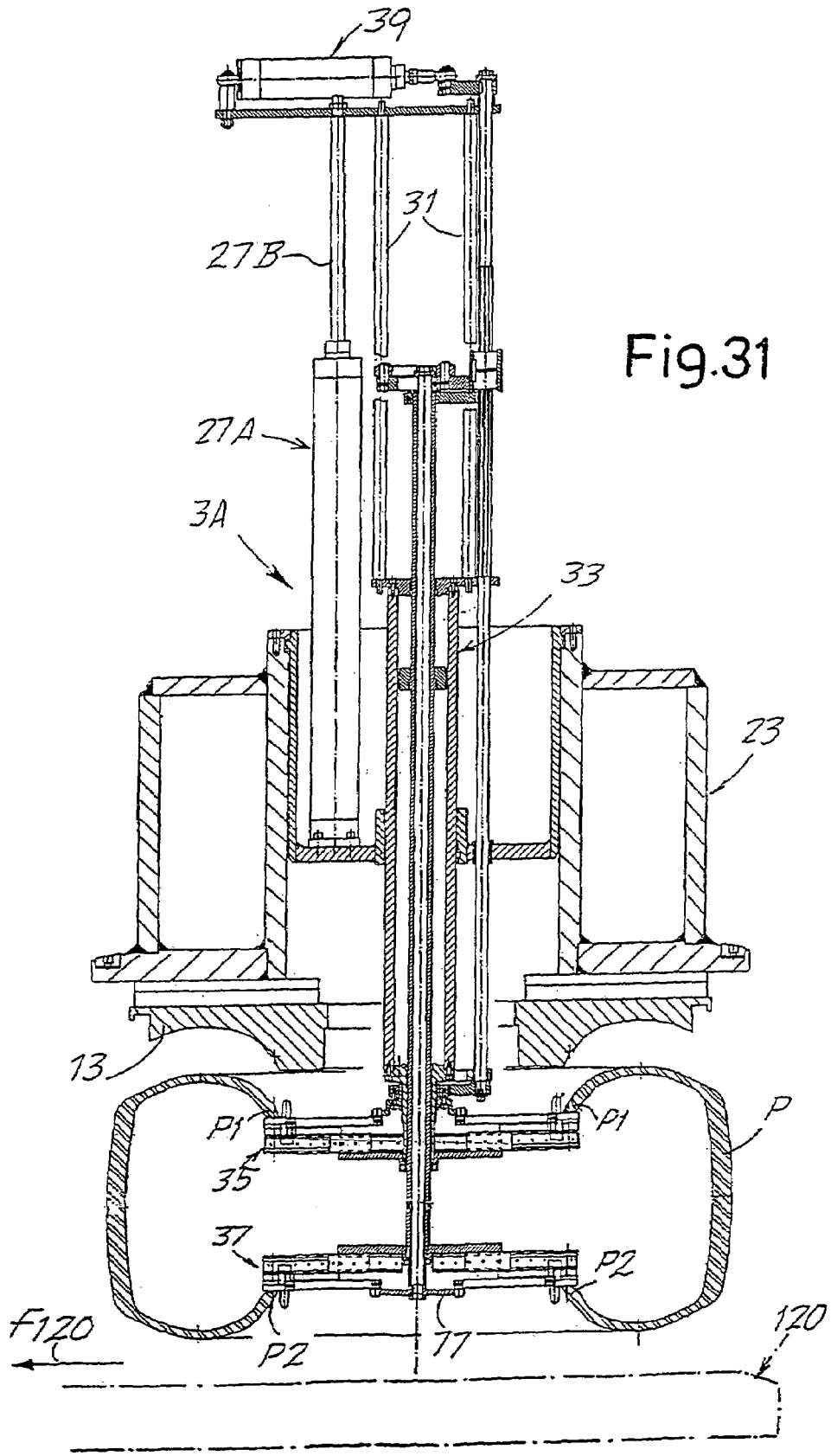

FIGS. 28–31 show a series of stages for the unloading of the tire after its curing and for removing the tire to allow the next work cycle to take place. FIG. 28 shows the mold starting to open as the sectors 17 withdraw in the opposite direction to the centripetal arrows f17 of FIG. 21. The pan or end plate 15 of the mold is then lowered, as are the two discoidal elements 35 and 37 until they are positioned as shown in FIG. 29 in the central region of the tire—the tire still being supported by the pan or end plate 15. In this configuration the discoidal elements 35, 37 are again dilated to the condition shown in FIG. 30, that is until the pegs 65 of the discoidal element 35 reach a radial distance slightly less than the diametrical dimension of the bead P1, as seen in FIG. 30. As the pan or end plate 15 continues to descend, the tire ends up resting on the sectors 61 of the discoidal element 35 as seen in FIG. 31, so that the tire can be deposited and collected by a conveyor indicated in a general way by the outline 120 in FIG. 31. This removal assembly may be a discharging roller conveyor or a pan which can be placed underneath the tire to receive the tire and then transfer it in the direction of arrow f120 for subsequent processing, the discoidal element 35 being lowered slightly again, slightly shrunk in diametrical dimensions and then lifted back up toward the cup element 25.

FIGS. 35–44 show an example of a lower unit 3B of the machine 3 designed to insert into the tire, when the tire is housed in the mold, an elastic tubular bladder which is supplied with fluid at high pressure to compress the green rubber against the mold and allow the tire to be cured, in a manner which is basically known per se.

Figure 38:
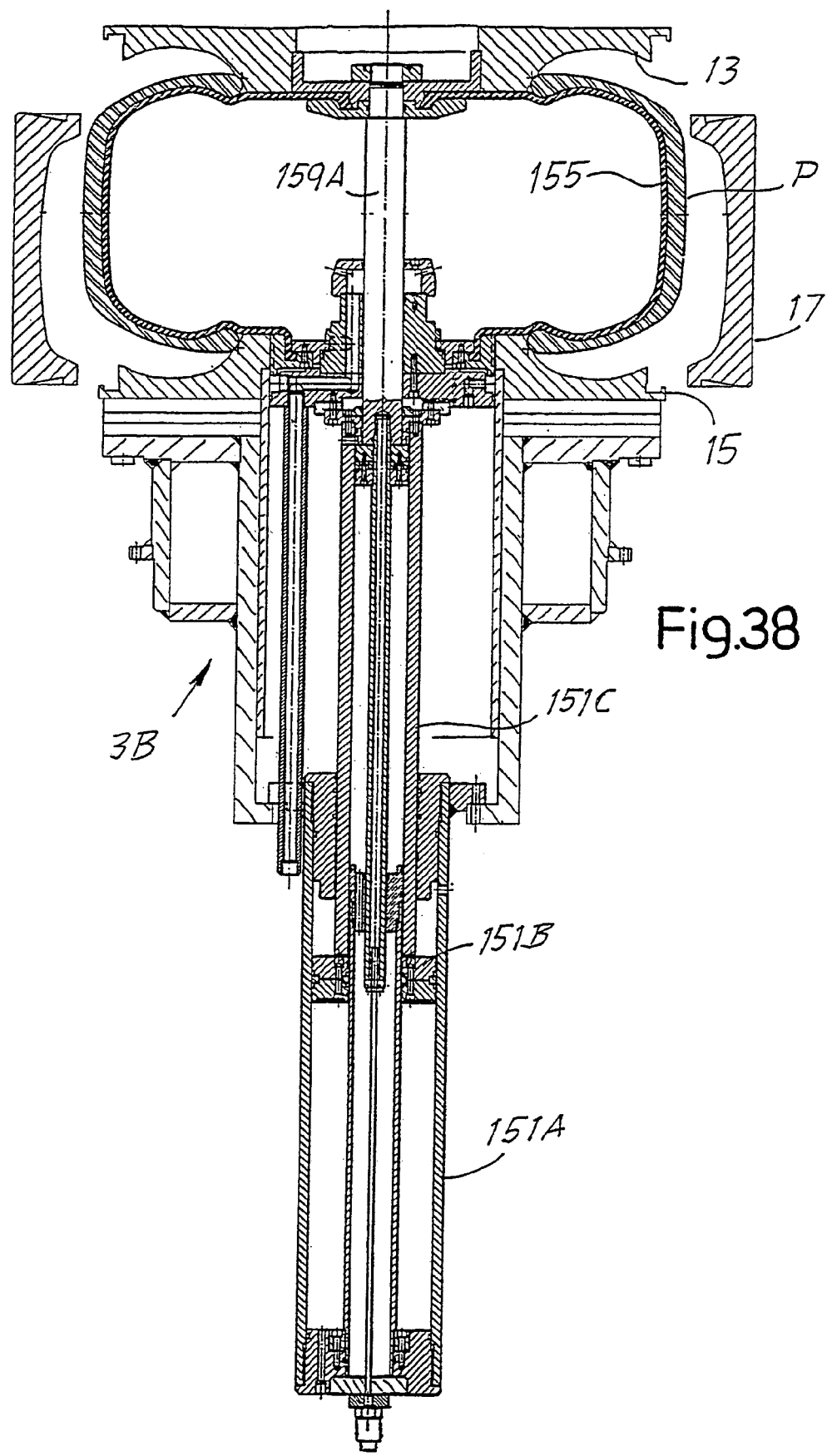
Figure 39:
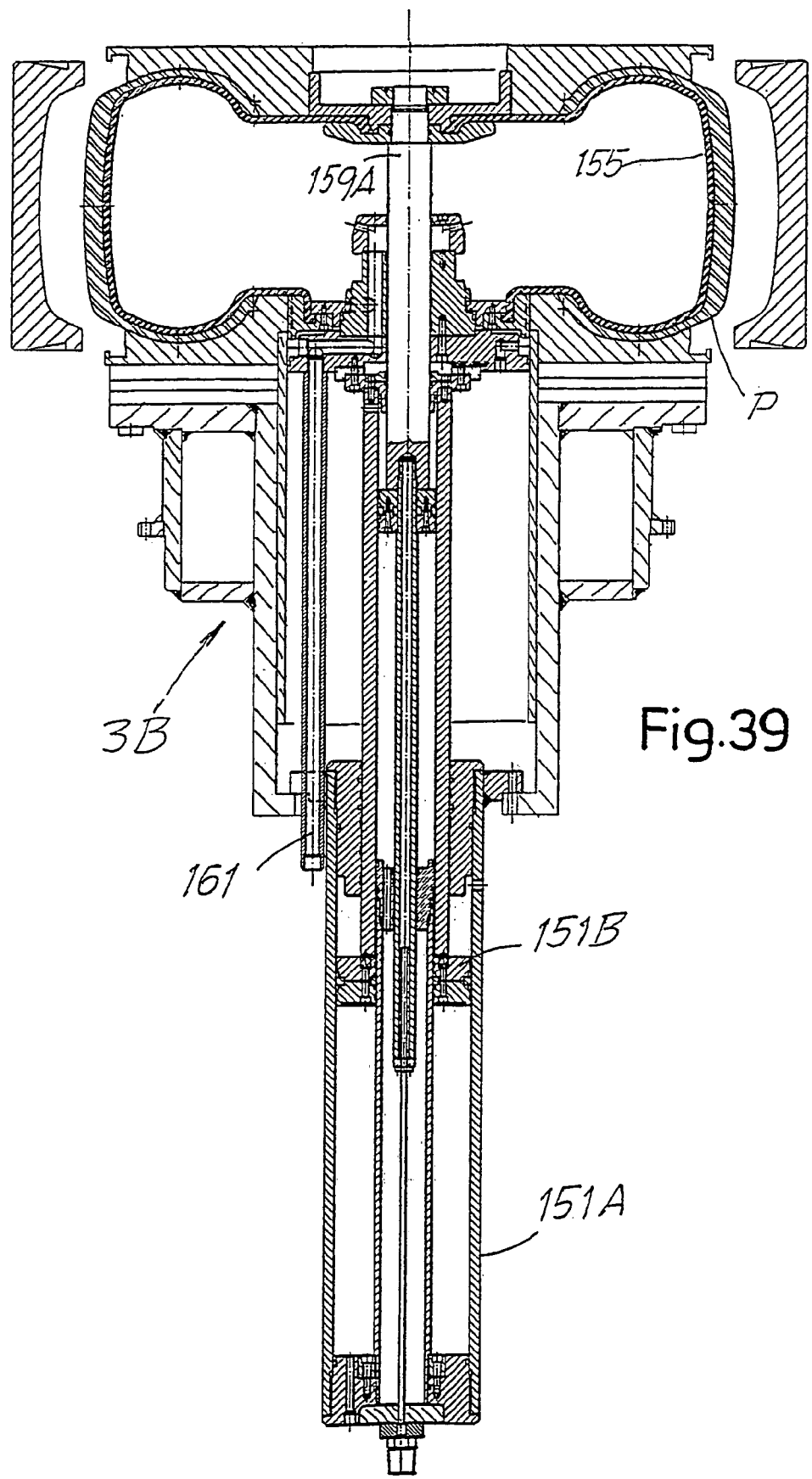

An actuator 151A, 151B, 151C is provided for moving a lower core 153 to which the elastic tubular bladder 155 is attached. An upper core 157 grips the upper edge of the elastic tubular bladder 155. This core 157 is controlled by an actuator 159A, 159B and 151C, this last being a common part shared with the actuator 151A, 151B and 151C. A pipe 161 supplies fluid at high pressure to the volume defined by the elastic tubular bladder 155 and cores 153 and 157. During the stages shown in FIGS. 35, 36 and 37 the bladder 155 is raised into the tire and initial inflation of the bladder begins, at which time the shaping gas which was fed in earlier as described above into the tire before and during closure of the mold must be discharged and must in fact be expelled when the interior of the tire is to be occupied by the dilated bladder as indicated in FIG. 38. The shaping gas must be expelled through the upper discharge 110, and the similar lower discharge 109. Once in the condition shown in FIG. 38, the mold is closed as shown in FIGS. 39 and 40, compression inside the bladder 155 is completed, and the tire undergoes curing.

Figure 40:
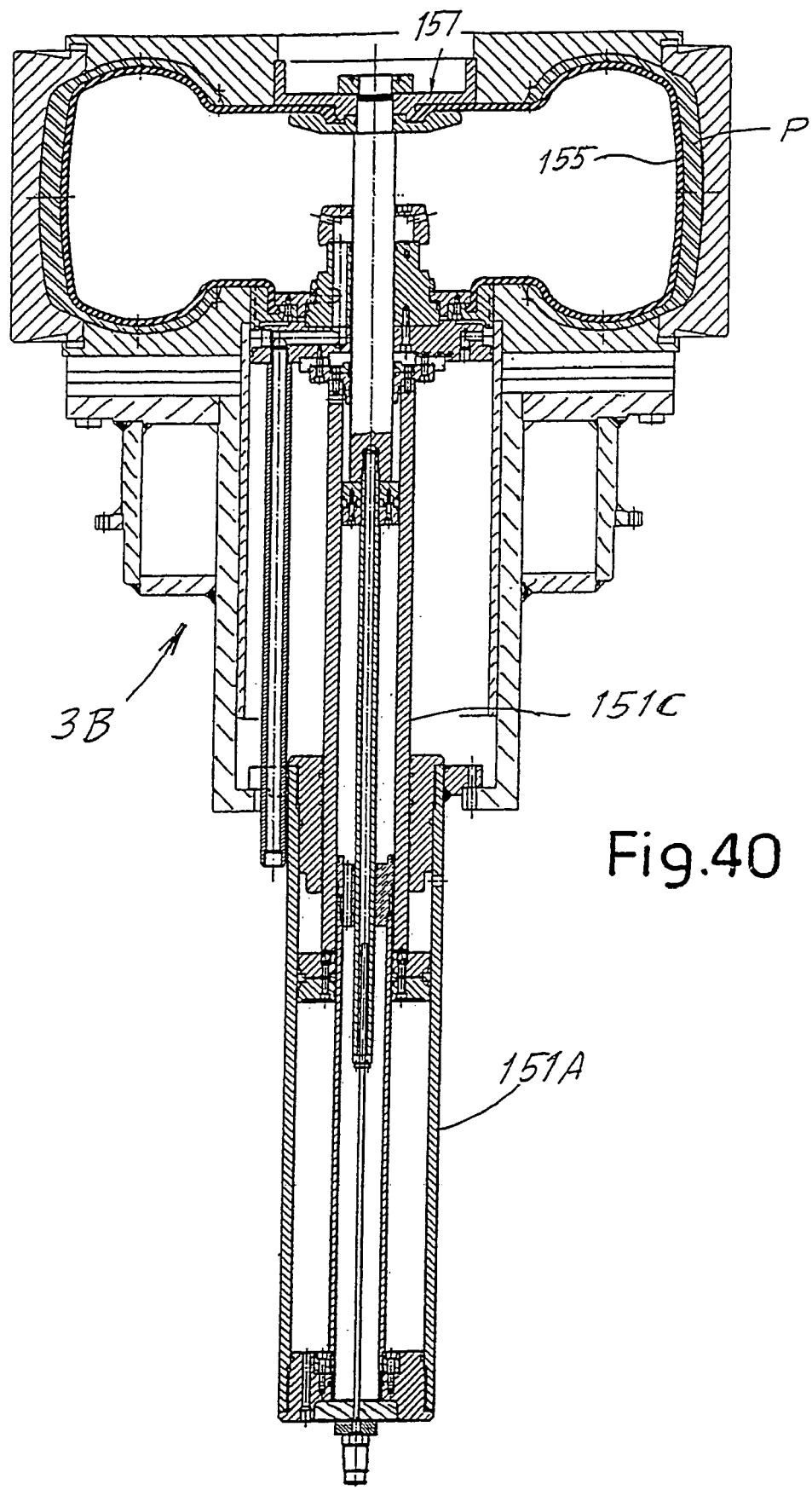
Figure 41:
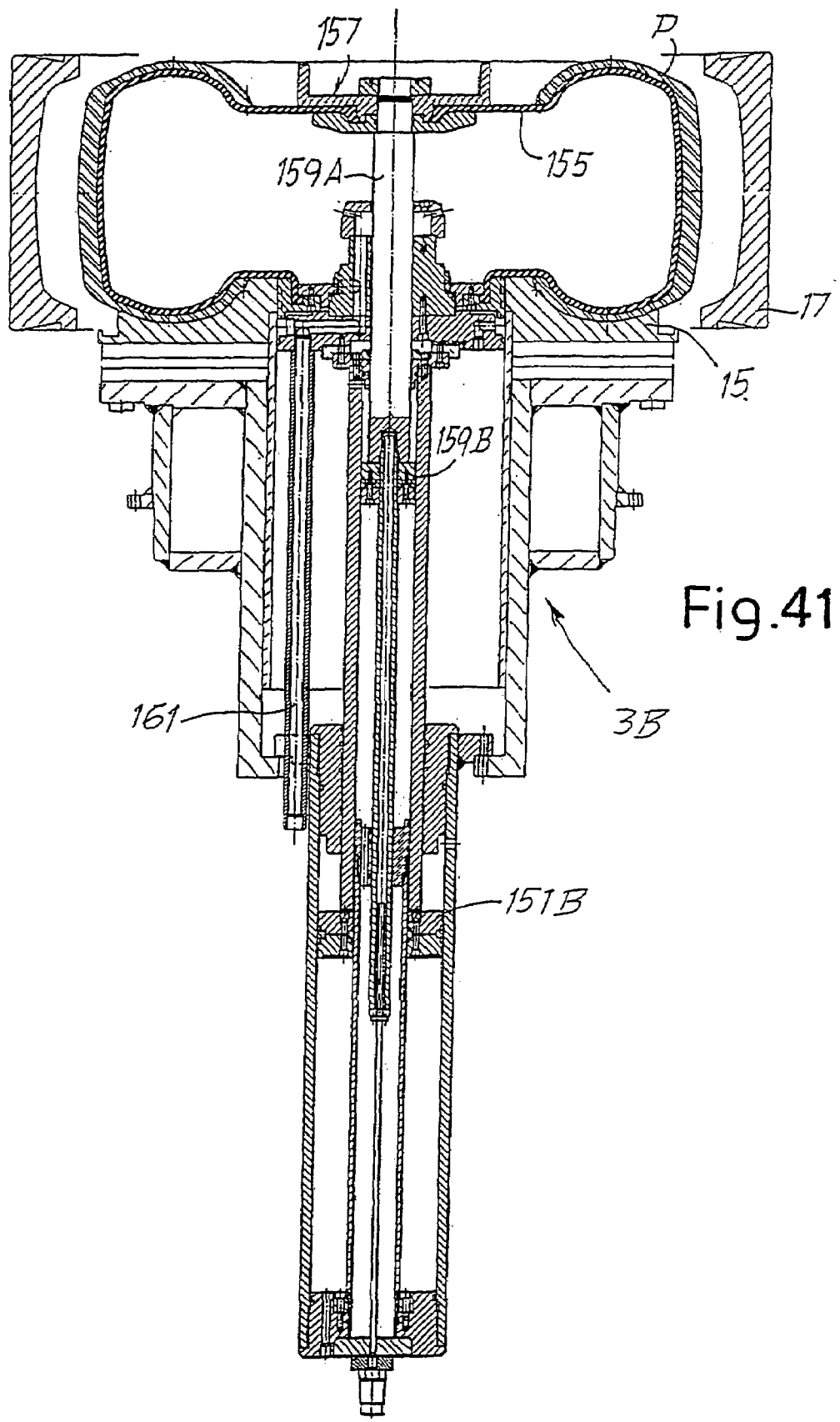
Figure 42:
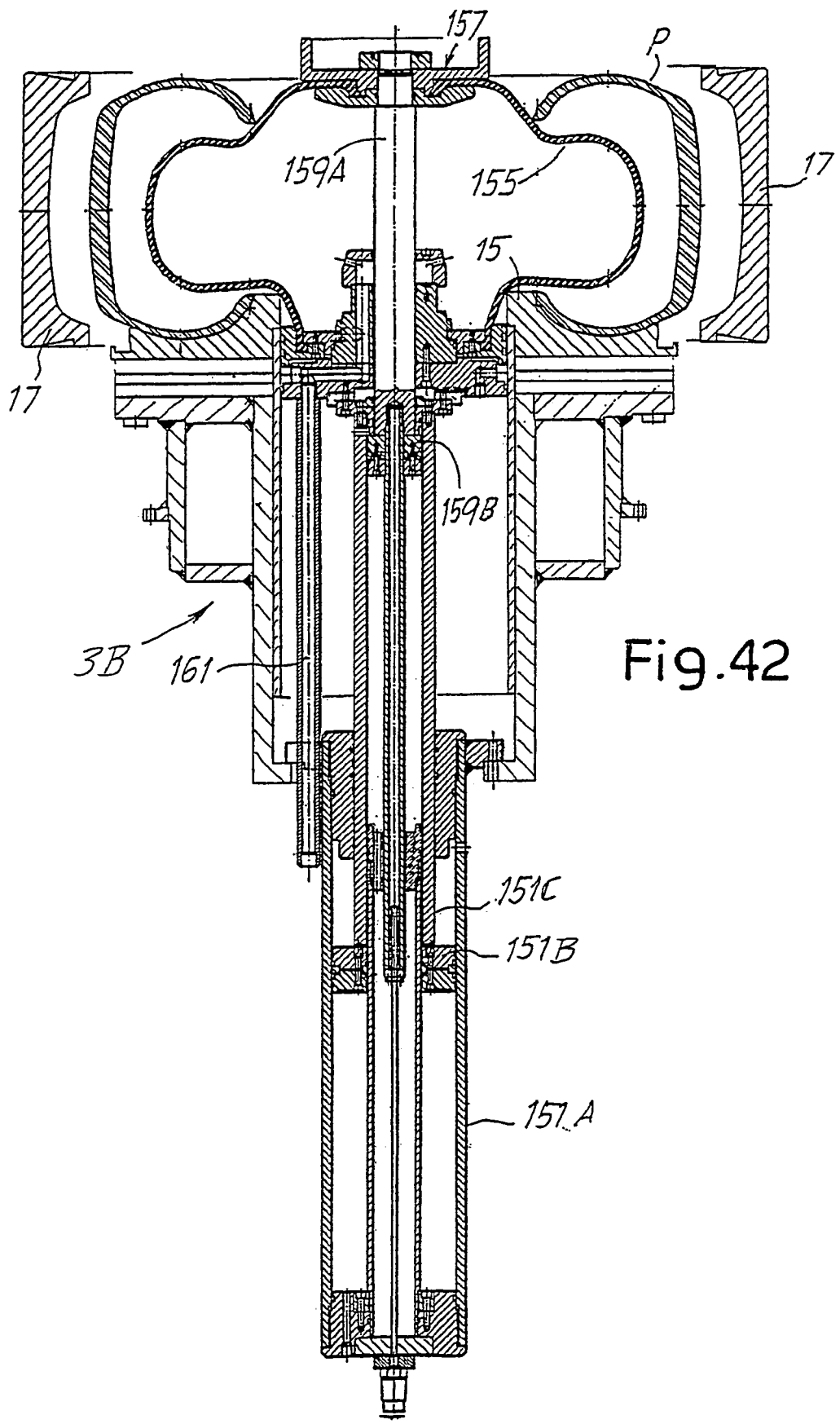
Figure 43:
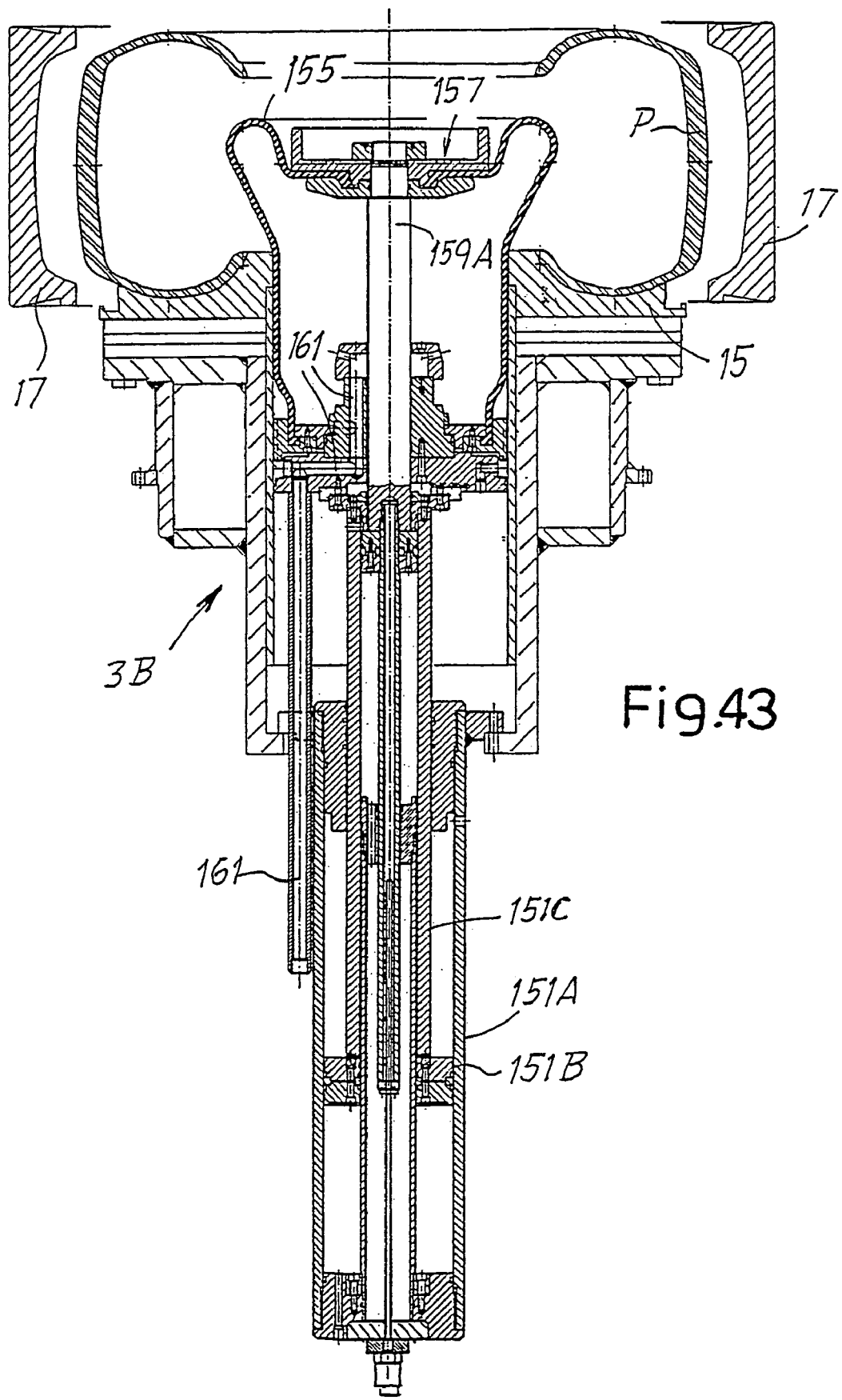
Figure 44:
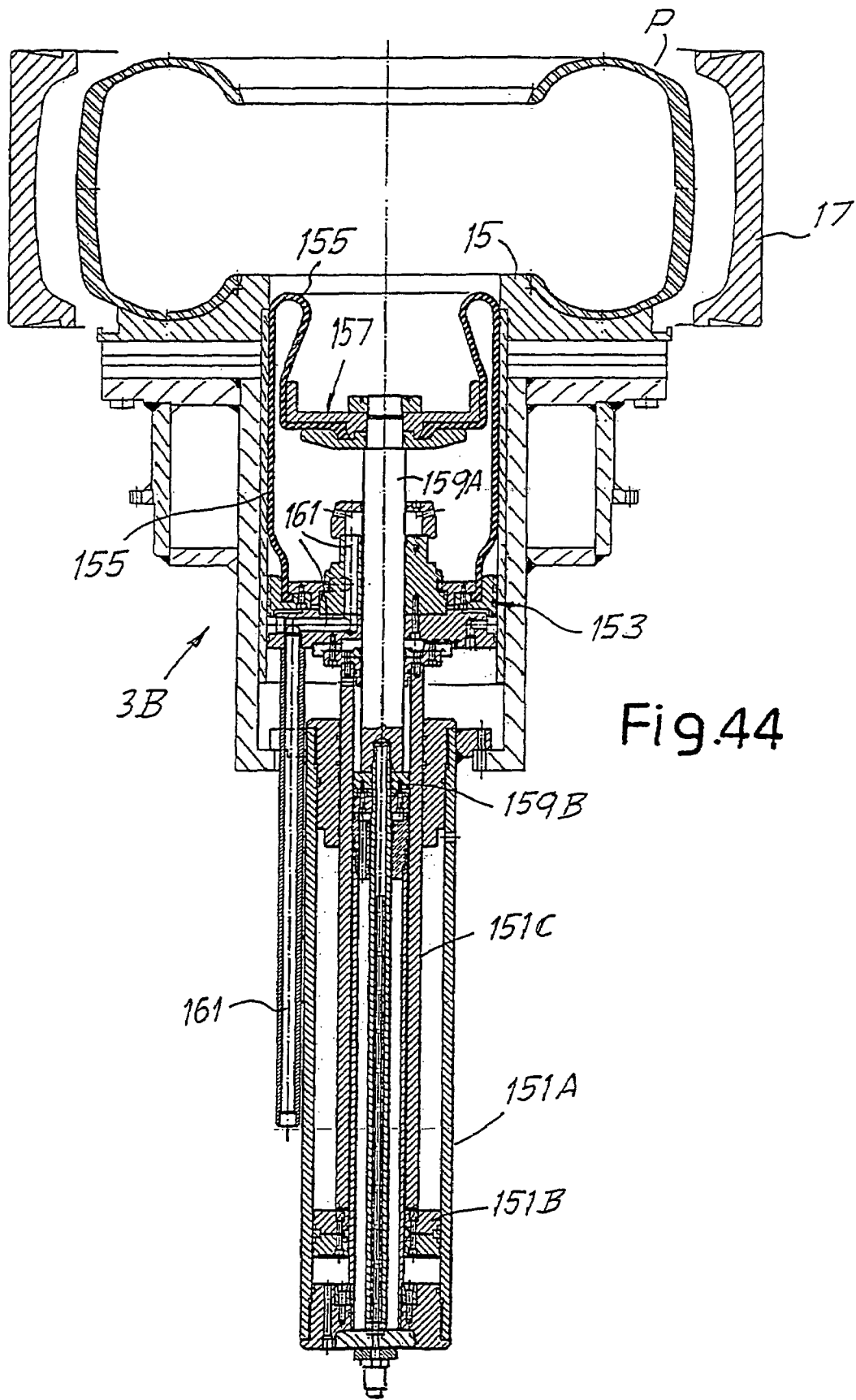

Following curing in the configuration shown in FIG. 40 the mold is reopened as shown in FIGS. 41 and 42 (having first discharged, through 111, the pressurizing fluid from the bladder 155), leading back to the position shown in FIG. 44 via the intermediate position shown in FIG. 43.

FIGS. 45–54 show a different elastic bladder system for applying the internal compression for curing purposes and for discharge from this assembly.

This version uses in the first place a different mold closing system consisting of two pans or end plates 213, 215 and sectors 217 which have an inclined outer profile practically in frustoconical sections, to be acted upon by a frustoconical skirt 219 by which the mold is closed when the components 213, 215, 217 are lowered relative to the skirt 219. This form of mold is known per se. Another variant of the bladder system is represented by the mechanisms for moving the bladder, which are constructed to reduce the vertical dimensions compared with the system described previously.

A base 230 supports guide columns 232 connected to corresponding double-acting fluid actuators, shown in a general way at 234, for raising and lowering a platform 236 to which the elastic tubular bladder assembly belongs. Extending from the lower part of the platform 236 is a column 238 carrying the upper core 240 to which the upper edge of the bladder 242 is attached.

The lower edge of the bladder 242 is attached to a lower core 244 which slides up and down the column 238 independently of the upper core 240. The lower core 244 is moved up and down the column 238 by two symmetrical toggles 246, 248 each having an intermediate hinge 250, an upper hinge 252 connected to the core 244 and a lower hinge 254 which is turned by one of a pair of gearwheels 256 that mesh with each other, one being powered by an actuator 258 hinged at 260 to the platform 236. This arrangement allows the core 244 to move up and down the column 238. The vertical dimension of this assembly is very small.

Figure 45:
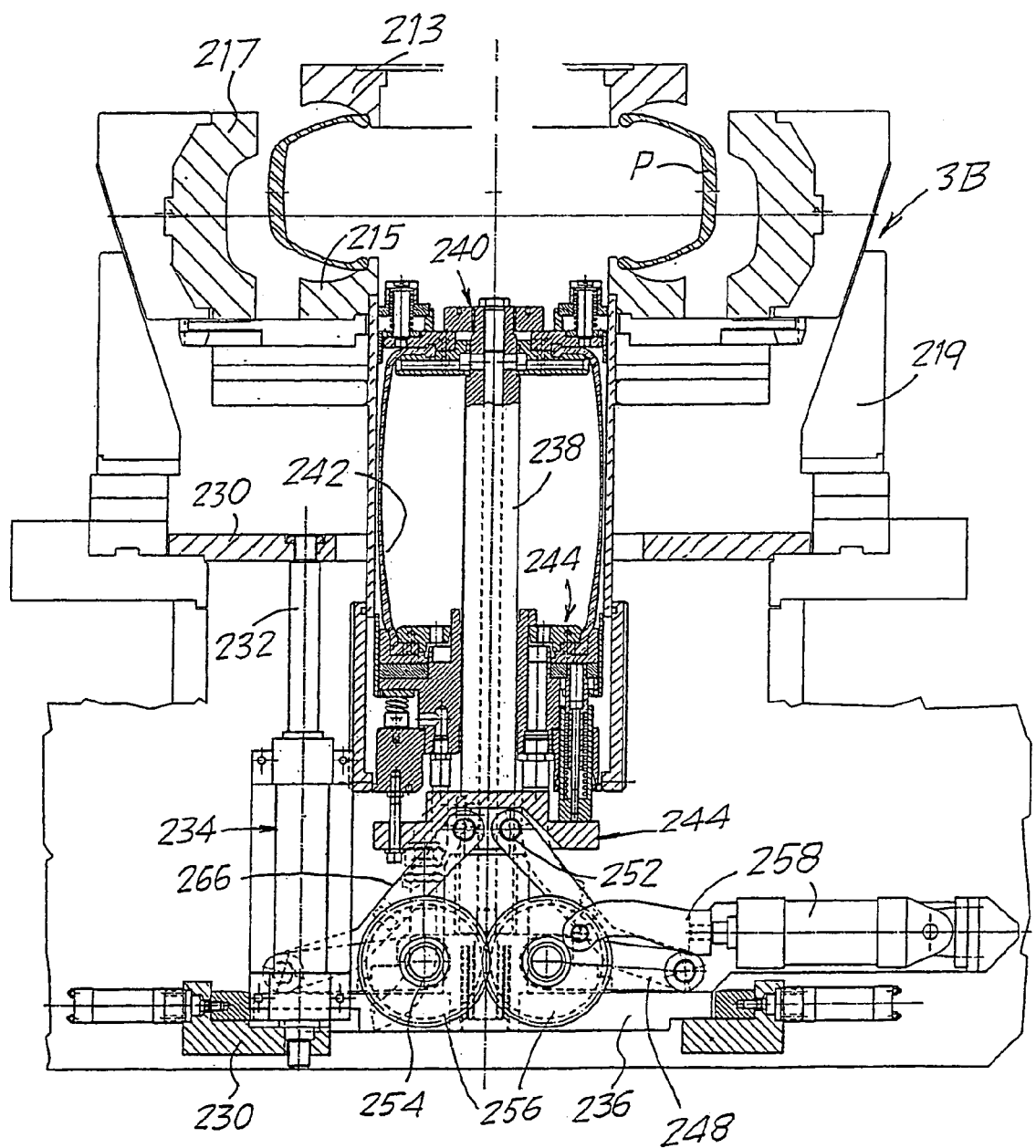
FIGS. 45–54 show a second elastic bladder system for applying the internal pressure for curing and unloading in the various stages of the relevant cycle.
Figure 46:
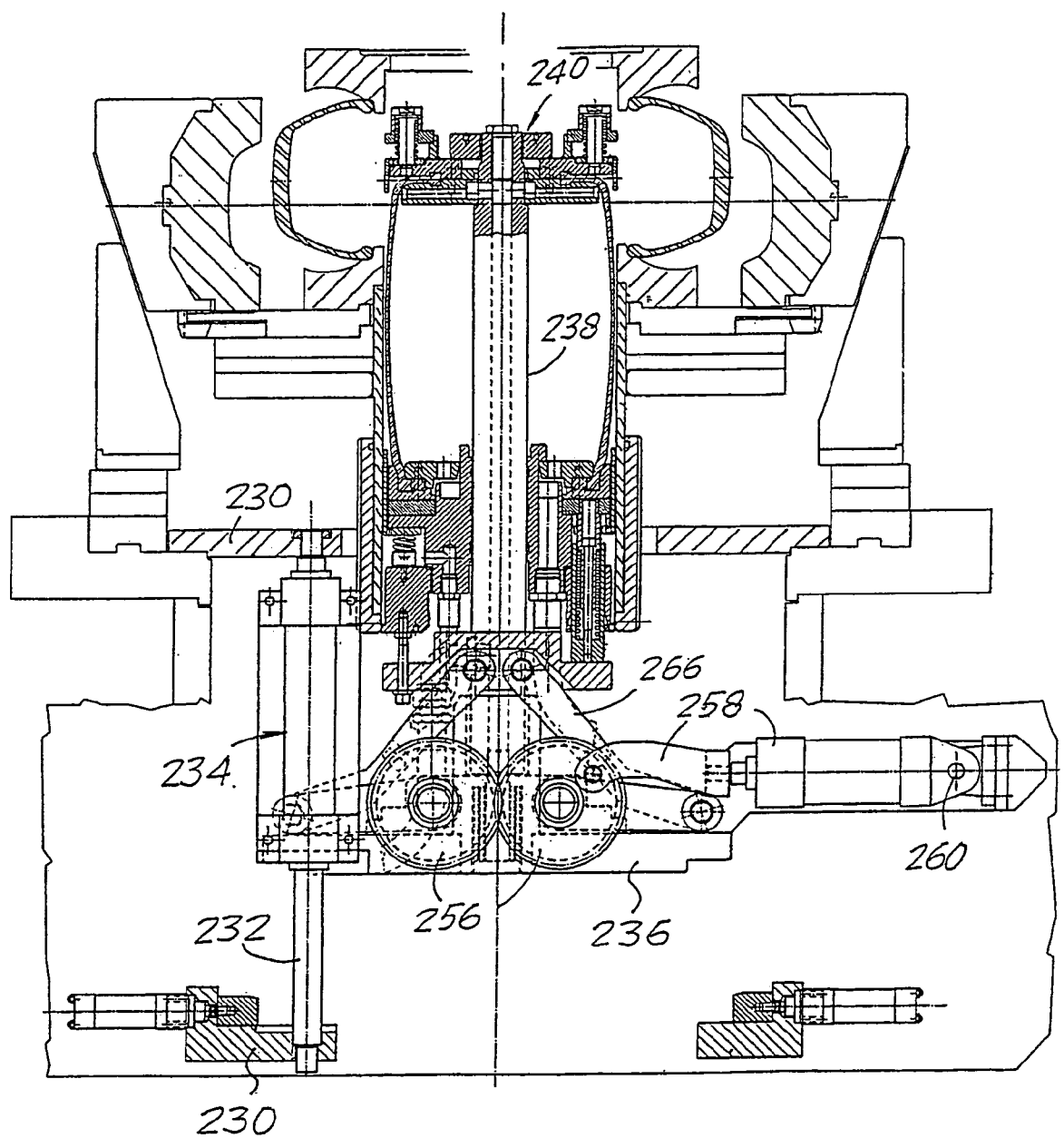
Figure 47:
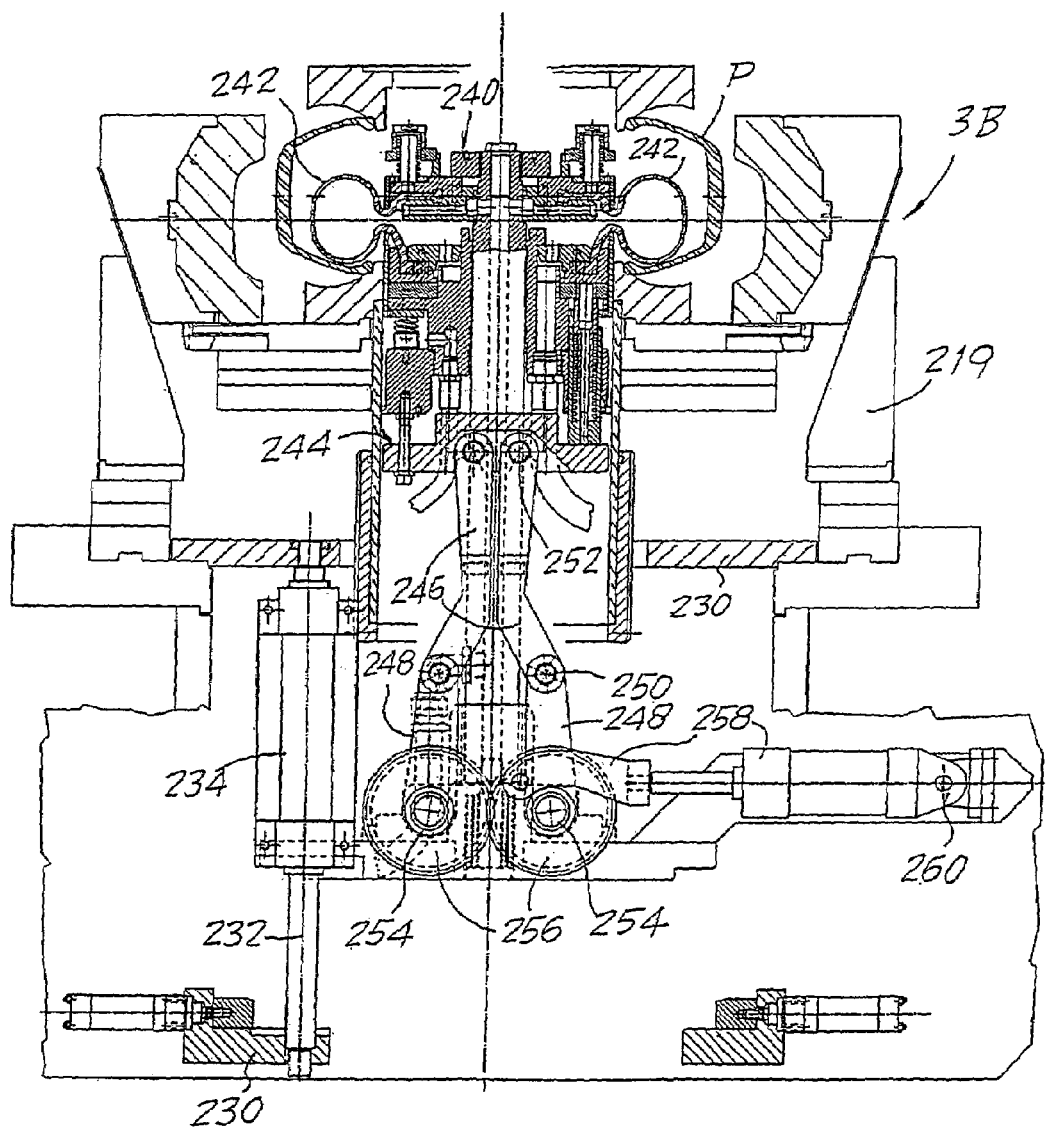
Figure 48:
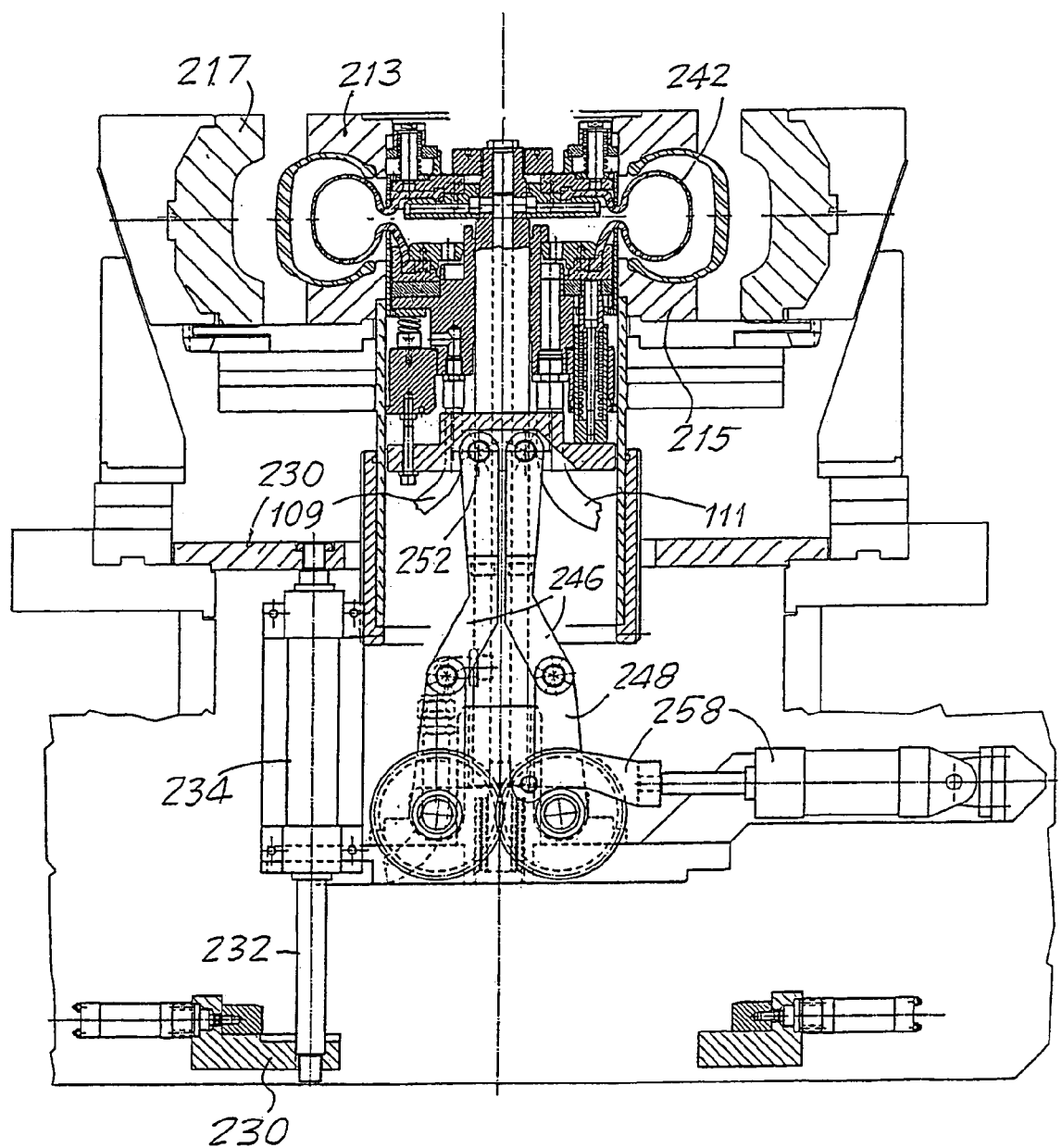
Figure 49:
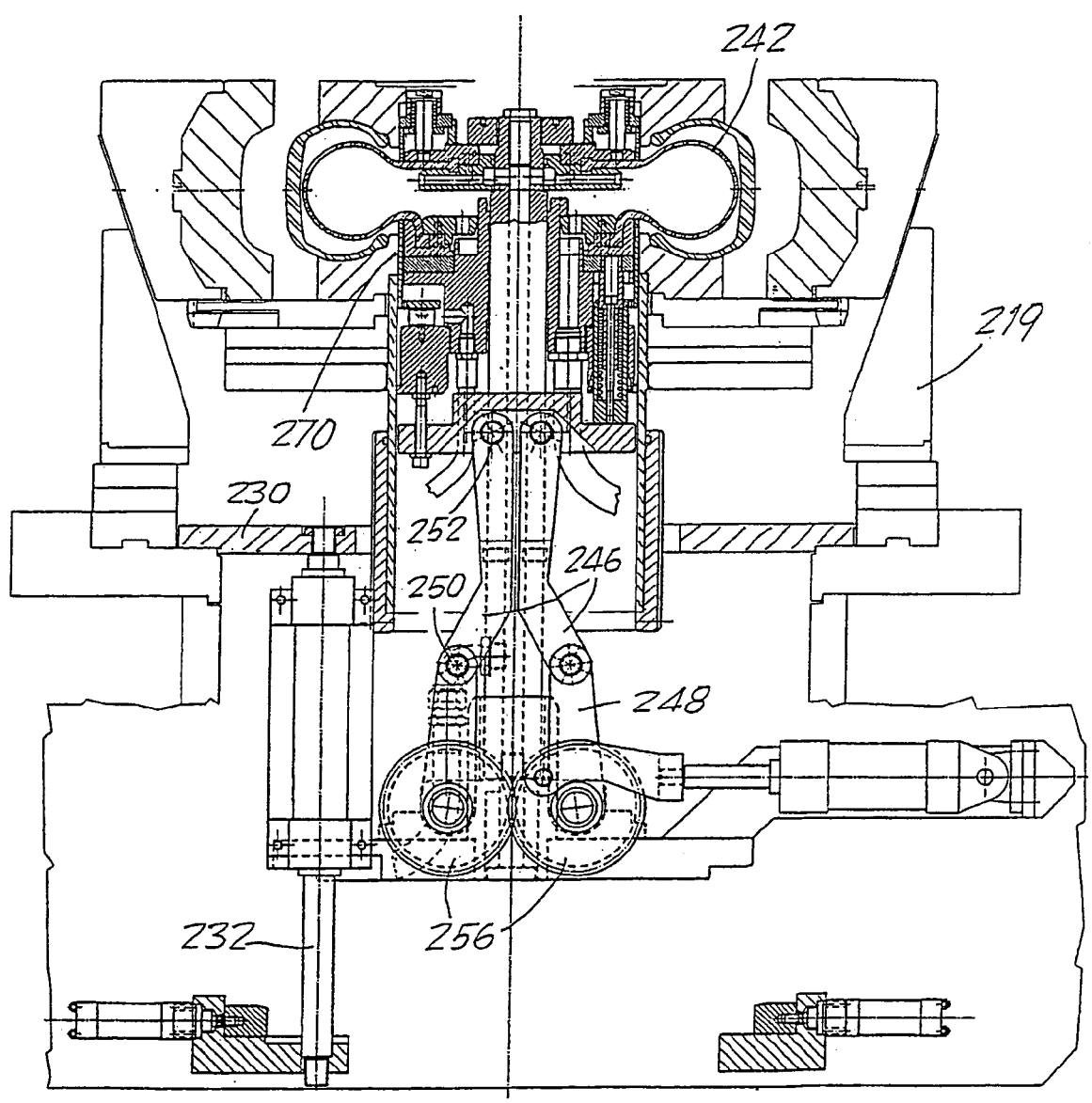
Figure 50:
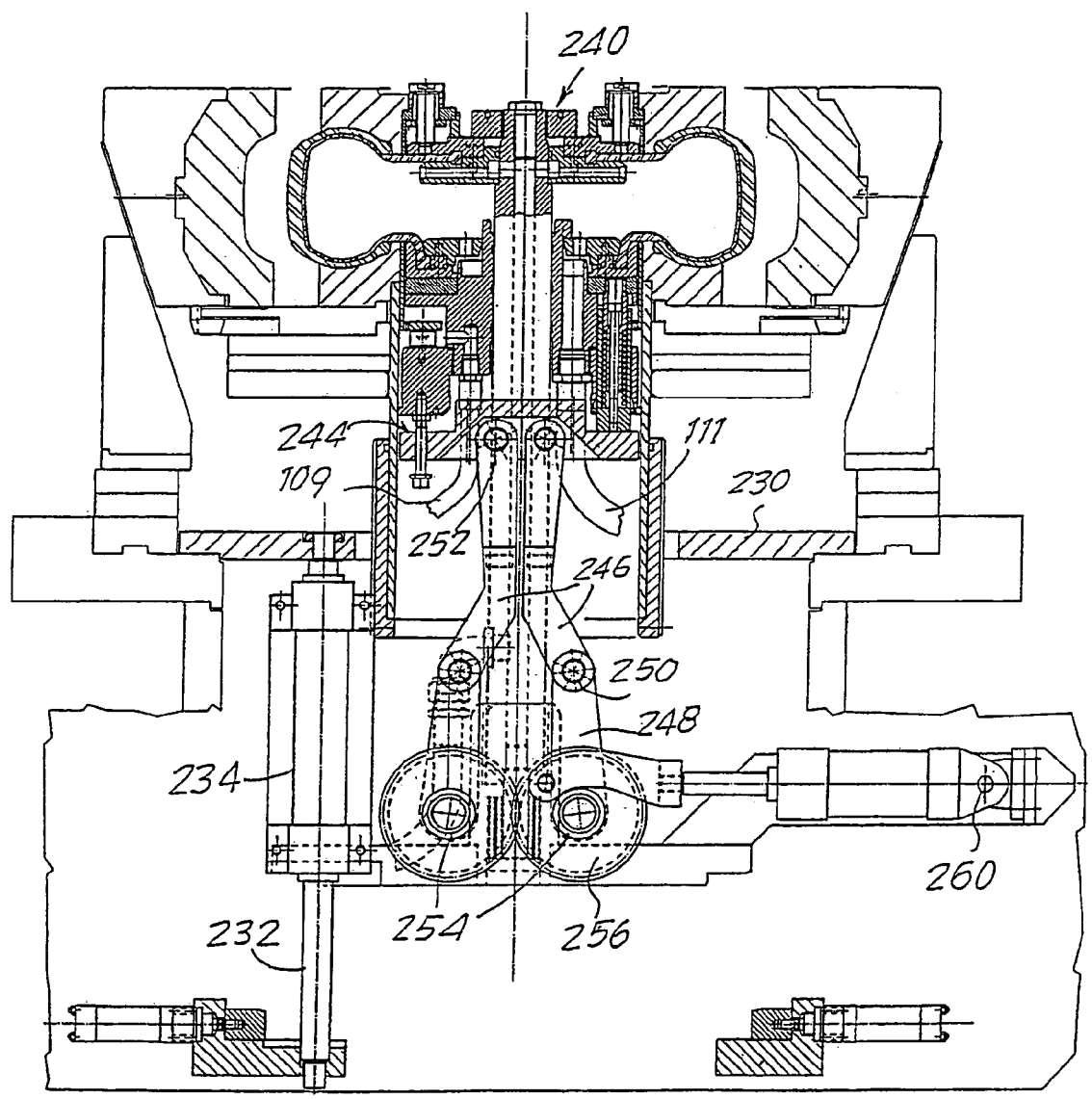
Figure 51:
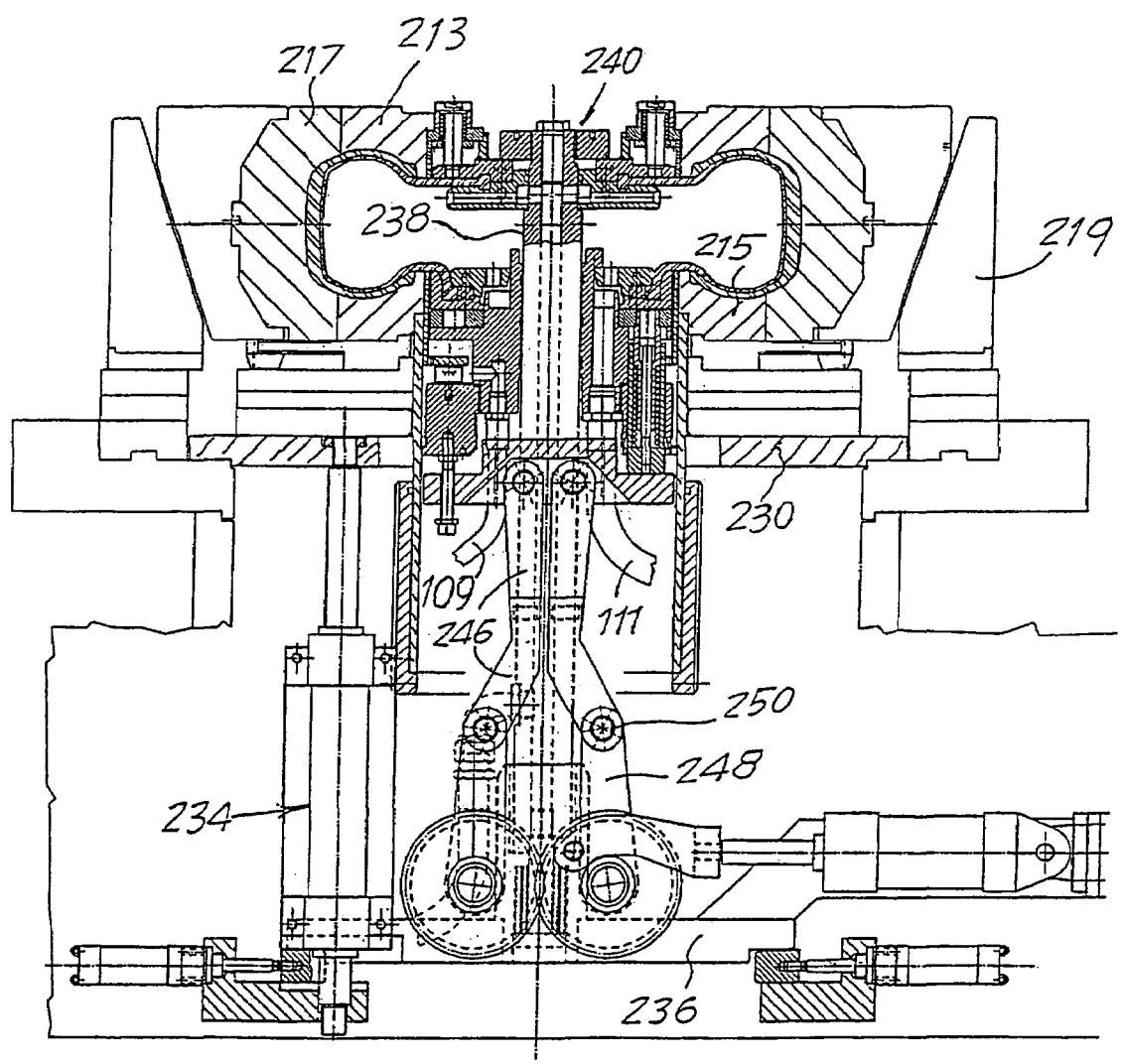
Figure 52:
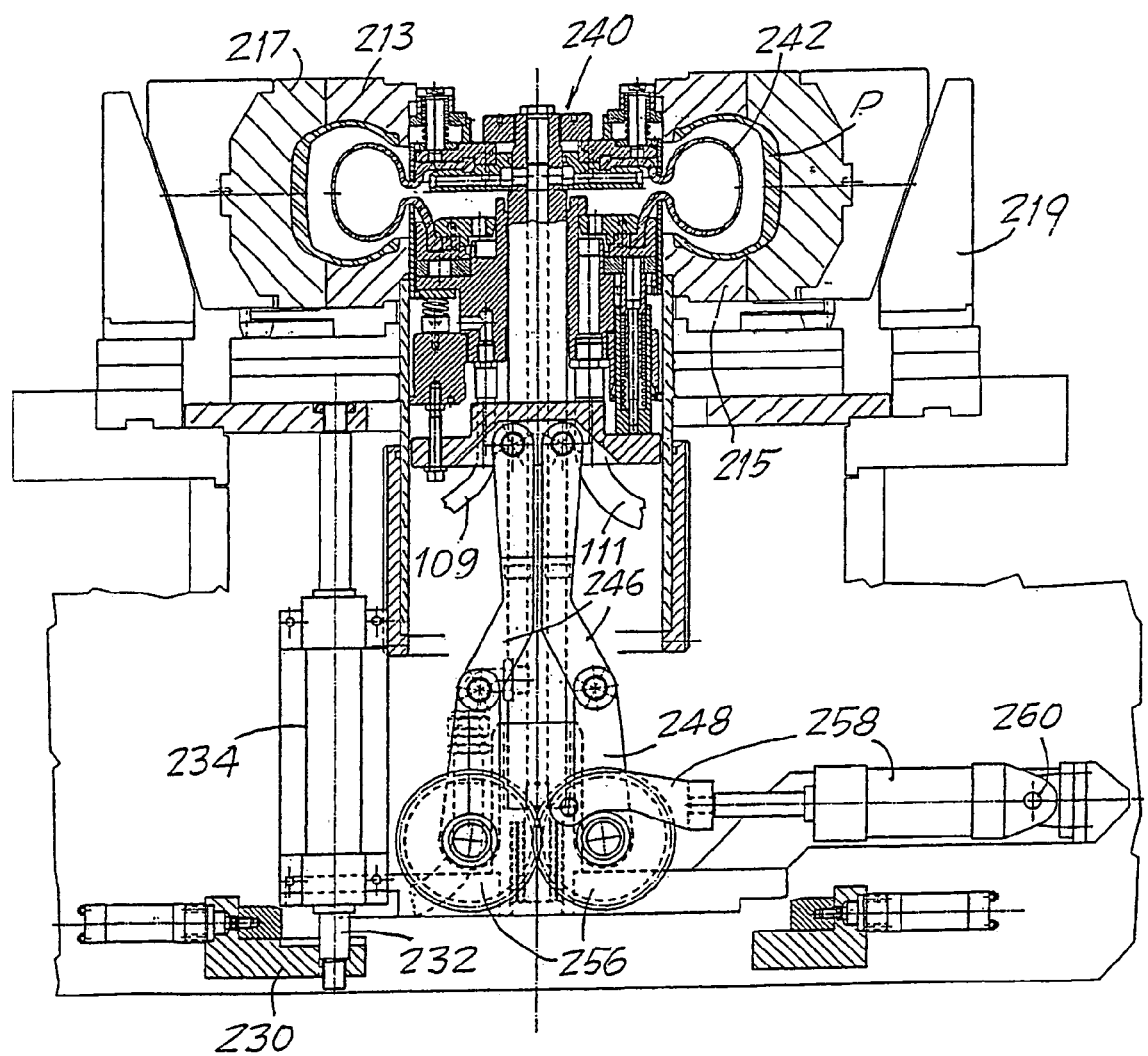
Figure 53:
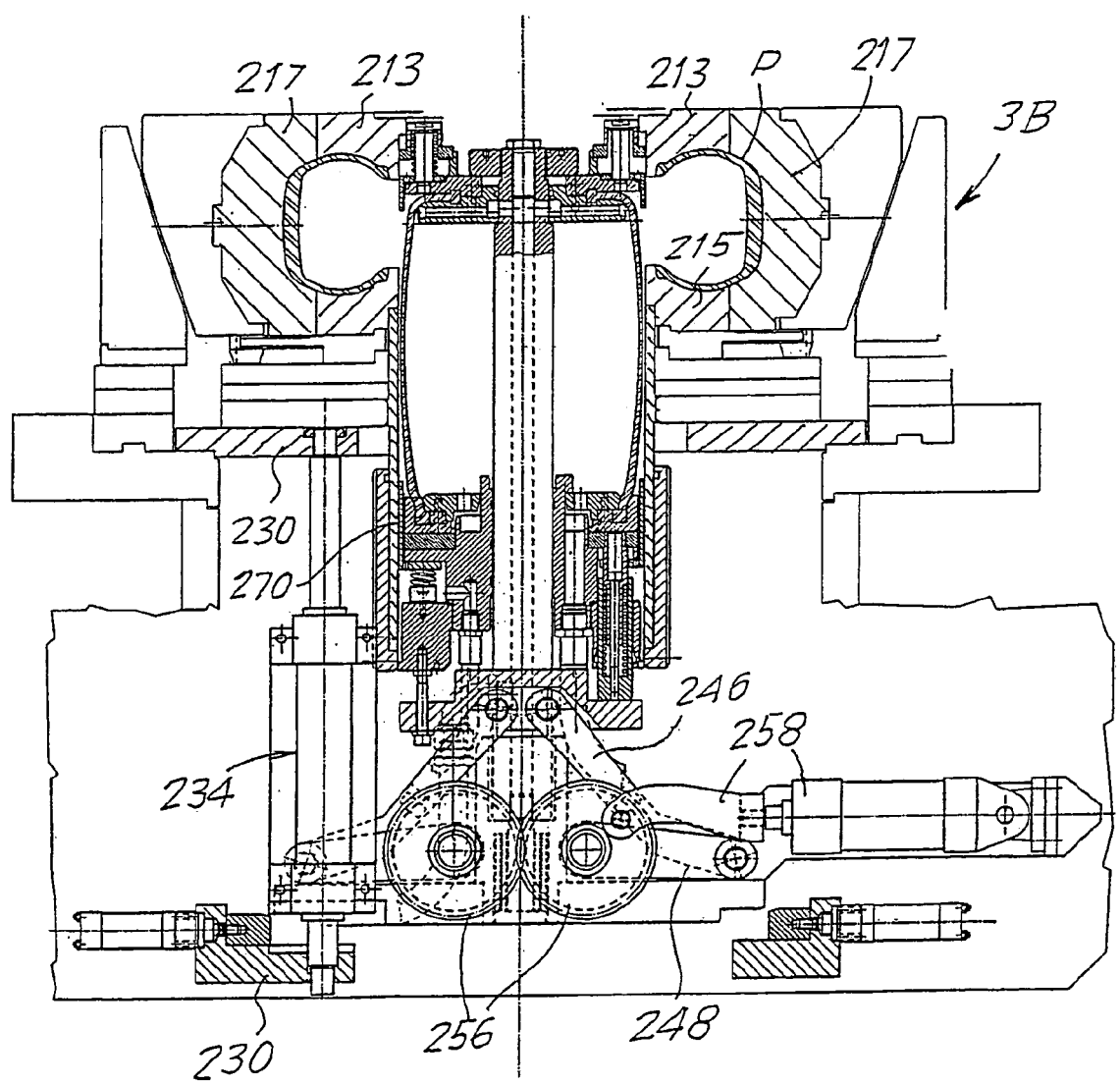
Figure 54:
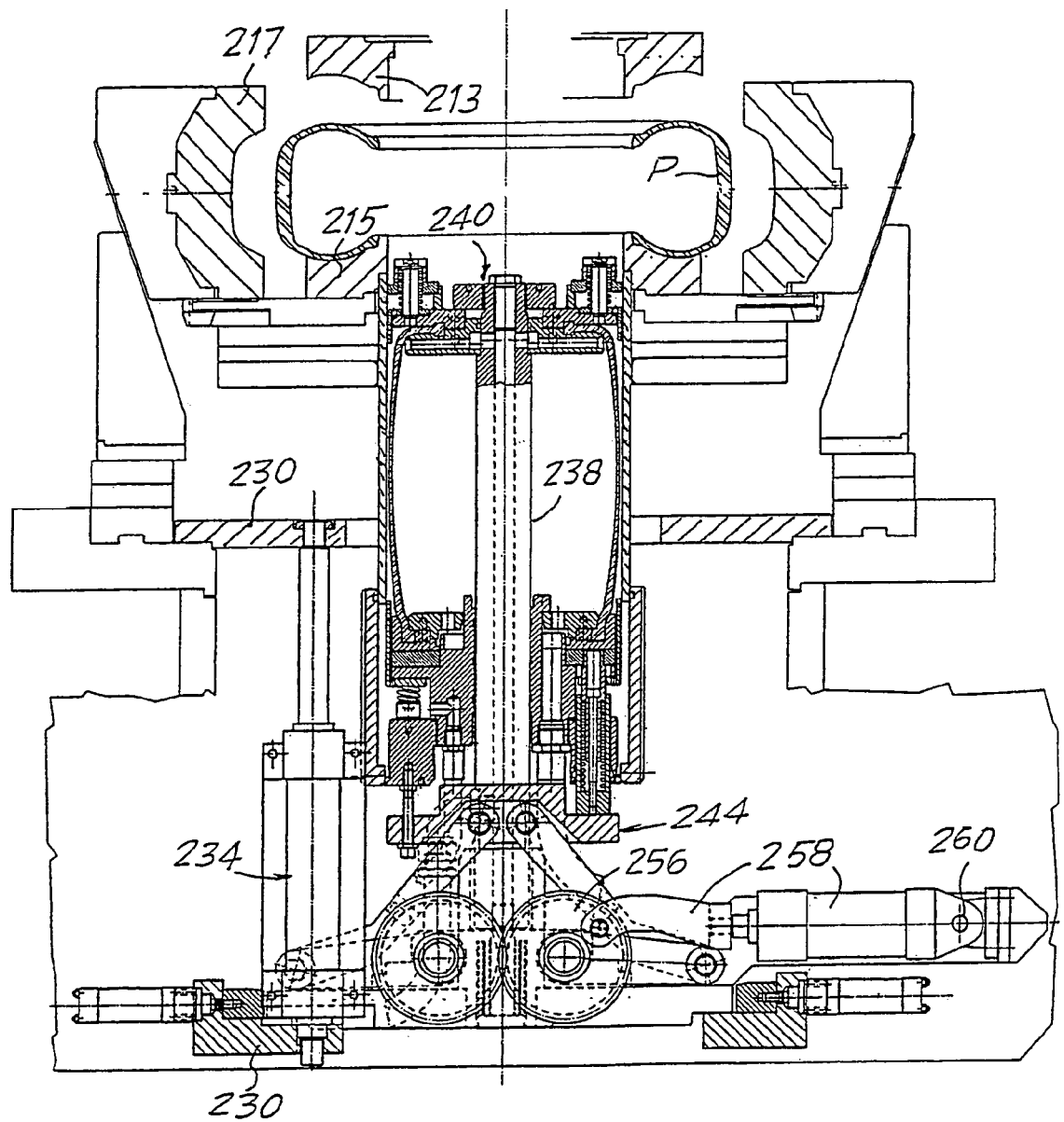

From the initial position shown in FIG. 45, which depicts the first stage of the cycle of this system, the platform 236 is raised by the actuators 234 along the columns 232 to the position shown in FIG. 46, where the upper core 240 is basically inside the tire P between the open mold components. The actuator 258 then immediately raises the core 244 by means of the two toggles 246, 248, 250 to the position shown in FIG. 47, in which the bladder, which has already partly begun to fill with the compression fluid, dilates inside the tire P. At this point (see FIG. 48) the end plate 213 moves down toward the end plate 215 and slightly squeezes the partially dilated bladder 242. As can be seen in FIG. 49, a tubular-walled diaphragm 270 is lowered to allow a more even dilation of the bladder 242 inside the tire until we reach the position shown in FIG. 50, in which the bladder 242 has reached the inside wall of the tire. FIG. 51 shows the position with the mold closed, closure occurring as the actuators 234 lower the platform 236 and due to the internal inclination of the skirt 219 pushing the sectors 217 in until the mold is closed. It is in these conditions shown in FIG. 52 that curing takes place, followed by opening of the mold as shown by the sequence of figures coming after FIG. 51 and up to FIG. 54, in which the toggles return the bladder to the condition illustrated earlier in FIG. 45 and the mold is opened to allow the cured tire to be taken hold of and lifted out for transfer to subsequent processing.

This latter version reduces the vertical size of the machine, which is much greater when using the arrangement shown in FIGS. 35–44.

It will be understood that the drawing shows only an example purely as a practical demonstration of the invention, and that the invention can be varied in its shapes and arrangements without thereby departing from the scope of the concept on which the invention is based. The presence of any reference numbers in the appended claims is for the purpose of facilitating the reading of the claims with reference to the description and to the drawing, and does not limit the scope of protection represented by the claims.

The invention claimed is:

1. Machine for curing green rubber in the production of tires for road vehicles and the like, comprising a mold with two circular pans or end plates and peripheral sectors defining the tread, and with bladder means for creating a pressure inside the tire, and with two opposed diametrically dilatable coaxial discoidal elements that are able to pass axially from the top into the tire when the tire is positioned in the mold, characterized in that:

said two opposed discoidal elements are able to move independently of each other axially;

said discoidal elements have sectors that can be moved radially forming horizontal contact surfaces for engaging from the inside the annular beads of the tire, when said discoidal elements are moved one from the other;

that said sectors of said discoidal elements have moreover spring loaded vertical pegs for radially making contact with the inner edge of the annular beads of the tires and that are able to retract on contact with the circular pans or end plates of the mold when said discoidal elements approach the respective circular pans or end plates of the mold;

means are provided for supplying a shaping gas at limited pressure into the tire while the two pans are being moved toward each other during mold closure; and means are provided for discharging at the appropriate time said shaping gas from inside the tire when said bladder means are expanded from inside the tire.

2. Machine according to claim 1, characterized in that said sectors are radially movable and operated by shaped links pivoting on an angularly movable actuator disk coaxial with said discoidal elements.

3. Machine according to claim 1, characterized in that it comprises, for bringing about the axial movements of said discoidal elements: a first actuator for lowering both of said discoidal elements into the tire, and raising them again; and a second actuator for axially moving one of said discoidal elements with respect to the other.

4. Machine according to claim 1, comprising control means for radially moving said sectors characterized in that said control means are able to bring about a partial dilation before the axial movement to contact the respective annular bead of the tire, followed by a further dilation to make radial contact with the edge of said bead, by means of said spring-loaded pegs.

5. Machine according to at least claim 1, characterized in that said bladder means are tubular in shape, and include two annular edges engaged on movable members of two axial actuators capable of positioning the bladder means in the mold in the closed position; means being provided for supplying a fluid at pressure into the bladder means for the molding and curing stage.

6. Machine according to claim 5, wherein said axial actuators are two cylinder-and-piston systems.

7. Machine according to claim 5, characterized in that one of said axial actuators is in the form of a cylinder-and-piston system which raises a bladder assembly and the other of said axial actuators comprises two symmetrical toggles controlled by a gear pair mechanism controlled by a single fluid actuator.

8. Machine according to claim 2, characterized in that it comprises, for bringing about the axial movements of said discoidal elements: a first actuator for lowering both of said discoidal elements into the tire, and raising them again; and a second actuator for axially moving one of said discoidal elements with respect to the other.

9. Machine according to claim 2, comprising control means for radially moving said sectors characterized in that said control means are able to bring about a partial dilation before the axial movement to contact the respective annular bead of the tire, followed by a further dilation to make radial contact with the edge of said bead, by means of said spring-loaded pegs.

10. Machine according to claim 3, comprising control means for radially moving said sectors characterized in that said control means are able to bring about a partial dilation before the axial movement to contact the respective annular bead of the tire, followed by a further dilation to make radial contact with the edge of said bead, by means of said spring-loaded pegs.

11. A machine for curing green rubber in the production of tires for vehicles, said machine comprising:
a mold having two circular pans or end plates and peripheral sectors defining a tread;
a bladder means for creating a pressure inside a tire;
two opposed diametrically dilatable coaxial discoidal elements passing axially from a top into the tire when the tire is positioned in said mold, said two opposed discoidal elements being independently axially movable relative to each other, said discoidal elements having sectors that move radially to form horizontal contact surfaces for engaging annular beads located on the tire when said discoidal elements are moved relative to one another, said sectors having spring-loaded vertical pegs for radially making contact with an inner edge of the annular beads of the tire, said sectors retracting on contact with said circular pans or end plates of said mold when said discoidal elements approach said circular pans or end plates of said mold;
a means for supplying a shaping gas at limited pressure into a tire while said circular pans or said end plates move toward each other during mold closure; and
a means for discharging said shaping gas from inside the tire when said bladder means expands within the tire.

12. A machine in accordance with claim 11, wherein said sectors that are radially movable and operated by shaped links pivoting on an angularly movable actuator disk coaxial with said discoidal elements.

13. A machine in accordance with claim 11, further comprising:
a first actuator for lowering both of said discoidal elements into the tire, and raising them again; and
a second actuator for axially moving one of said discoidal elements with respect to the other.

14. A machine in accordance with claim 11, further comprising a control means for radially moving said sectors, wherein said control means brings about a partial dilation before axial movement to contact the respective annular bead of the tire, followed by a further dilation making radial contact with the edge of said bead by means of spring-loaded pegs.

15. A machine in accordance with claim 11, further comprising a means for supplying a fluid at pressure into said bladder means during a molding and curing stage, said bladder means being tubular in shape, and including two annular edges engaging on movable members of two axial actuators positioning said bladder means in said mold in a closed position.

16. A machine in accordance with claim 15, wherein said axial actuators are two cylinder-and-piston systems.

17. A machine in accordance with claim 15, wherein one of said axial actuators is a cylinder-and-piston system that raises a bladder assembly and the other of said axial actuators comprises two symmetrical toggles controlled by a gear pair mechanism, said gear pair mechanism being controlled by a single fluid actuator.

18. A machine for curing rubber, said machine comprising:
a mold having two circular pans or end plates and peripheral tread sectors;
a bladder means for creating a pressure inside a tire after the tire is placed within said mold; and
two opposed upper and lower independently axially movable coaxial discoidal elements being independently axially movable relative to each other, said discoidal elements passing axially from the top of the tire positioned in said mold, said discoidal elements having radially movable sectors contacting annular beads on an inner edge of the tire, said radially movable sectors retracting after contacting said circular pans or end plates of said mold when said discoidal elements approach said circular pans or said end plates of said mold.

19. A machine in accordance with claim 18, further comprising a means for supplying a shaping gas at limited pressure into a tire while said circular pans or said end plates move toward each other during mold closure.

20. A machine in accordance with claim 18, further comprising a means for discharging a shaping gas from inside the tire when said bladder means expands within the tire.

* * * * *